United States Patent
Hagras et al.

(10) Patent No.: US 12,327,201 B2
(45) Date of Patent: Jun. 10, 2025

(54) EXPLAINABLE ARTIFICIAL INTELLIGENCE MECHANISM

(71) Applicant: LOGICAL GLUE LIMITED, Portsmouth (GB)

(72) Inventors: Hani Hagras, Colchester (GB); Gonzalo Ruiz Garcia, London (GB)

(*) Notice: Subject to any disclaimer, the term of this patent is extended or adjusted under 35 U.S.C. 154(b) by 898 days.

(21) Appl. No.: 17/289,947

(22) PCT Filed: Oct. 29, 2019

(86) PCT No.: PCT/GB2019/053045
§ 371 (c)(1),
(2) Date: Apr. 29, 2021

(87) PCT Pub. No.: WO2020/089597
PCT Pub. Date: May 7, 2020

(65) Prior Publication Data
US 2022/0036221 A1 Feb. 3, 2022

(30) Foreign Application Priority Data
Oct. 30, 2018 (GB) ....................... 1817684

(51) Int. Cl.
*G06N 5/04* (2023.01)
*G06N 5/045* (2023.01)
*G06N 5/048* (2023.01)

(52) U.S. Cl.
CPC ............. *G06N 5/045* (2013.01); *G06N 5/048* (2013.01)

(58) Field of Classification Search
None
See application file for complete search history.

(56) References Cited

PUBLICATIONS

Chimatapu et al ("Interval Type-2 Fuzzy Logic Based Stacked Autoencoder Deep Neural Network for Generating Explainable AI Models in Workforce Optimization" 2018) (Year: 2018).*
Ribeiro et al ("Why Should I Trust You?" Explaining the Predictions of Any Classifier, 2016) (Year: 2016).*
Addison et al ("Stepwise Linear Regression for Dimensionality Reduction in Neural Network Modelling" 2004) (Year: 2004).*
Peraza et al ("Interval type-2 fuzzy logic for dynamic parameter adaptation in the Harmony search algorithm" 2016) (Year: 2016).*
Adadi et al ("Peeking Inside the Black-Box: A Survey on Explainable Artificial Intelligence (XAI)" 2018) (Year: 2018).*
Mencar et al ("Paving the way to explainable artificial intelligence with fuzzy modeling" Sep. 6-7, 2018) (Year: 2018).*

* cited by examiner

*Primary Examiner* — Lut Wong
(74) *Attorney, Agent, or Firm* — John F. Vodopia

(57) ABSTRACT

A method of determining and explaining an artificial intelligence, AI, system employing an opaque model from a local or global point of view, the method comprising the steps of providing an input and a corresponding output of the opaque model; sampling the opaque model around the input to generate training data samples; performing feature selection to determine dominant features generating a Type-2 Fuzzy Logic Model, FLM; training the Type-2 FLM with the training data samples; and inputting the input into the Type-2 FLM to provide an explanation of the output from the opaque model.

12 Claims, 18 Drawing Sheets

EXPLAINABLE ARTIFICIAL INTELLIGENCE MECHANISM

FIELD OF THE INVENTION

The present invention relates to a system and to a method of determining and explaining dominant features and reasons in calculations carried out by Artificial Intelligence (AI) suites thus facilitating the understanding of the functioning of the suite.

BACKGROUND TO THE INVENTION

The recent increases in computing power coupled with increases in the availability and quantity of data have resulted in a resurgence of interest in potential applications of Artificial Intelligence (AI). AI and machine learning are being rapidly adopted for a range of applications in various industries like financial related industries, Internet of Things, smart cities, automotive, biological sciences, pharmaceutics, etc.

There are huge incentives to use AI and machine learning for business needs including opportunities for cost reduction, optimising processes, risk-management gains, productivity improvements, enhancing decision-making and developing new products/services as they all can contribute to greater profitability [1].

AI is a technology revolution which the regulators and participants hope will be inclusive and benefit everyone, not just a select few. The UK Information Commissioner Office (ICO) indicates that it wants to see transparent, explainable and narrow algorithms. A user-led point of view for algorithm explainability should be adopted where we need to understand customers' expectations of AI and be able to explain decisions in a way that users can understand.

According to the Financial Stability Board [2] new regulations have increased the need for efficient regulatory compliance, which has pushed financial institutions to automate and adopt new analytical tools that can include use of AI and machine learning. However, the use of complex algorithms like Deep Learning, Random Forests, Support Vector Machines (SVMs), Hidden Markov Models, etc., could result in a lack of transparency to consumers. AI—in its application of deep learning neural networks, complex algorithms and probabilistic graphical models—has become a 'black/opaque box' according to a growing number of researchers. We do not really know why an Opaque box AI system made a decision [3].

Hence, the use of these powerful AI and machine learning techniques, risks creating 'black/opaque boxes' in decision making that could create complicated issues. In contrast, decision trees and Bayesian networks are more transparent to inspection, however these methods are more suited to people familiar with data science and machine learning and not suitable to explain an AI decision in lay man language.

In 2010, public concerns about racial and other bias in the use of AI for criminal sentencing decisions and findings of creditworthiness may have led to increased demand for transparent artificial intelligence [4]. For example, it may be difficult for human users and for regulators—to grasp how decisions, such as those for trading and investment, have been formulated [5]. In addition, if AI and machine learning based decisions cause losses to intermediaries across the financial system, there may be a lack of clarity around responsibility [6].

For example, if a specific AI and machine learning application developed by a third party resulted in large losses, is the institution that conducted the trading solely responsible for the losses? Or would regulators or other parties be able to pursue potential claims against the application developer?

In 2017, Accenture recommended "Responsible AI: Why we need Explainable AI" [7]. The lack of transparency around applications may be problematic for both institutions and regulators when it may not be possible to understand how undesired events occurred and when steps may need to be taken to prevent a recurrence. Any uncertainty in the governance structure in the use of AI and machine learning might increase the risks to financial institutions [8]. If each investor makes their investment without fully understanding the applications and his or her possible losses entail or risky events, the aggregate risks could be underestimated. In addition, any uncertainty in the governance structure could substantially increase the costs for allocating losses, including the possible costs of litigation. According to the Financial Stability Board [2], the lack of interpretability or 'auditability' of AI and machine learning methods has the potential to contribute to macro-level risk. Many of the models that result from the use of black/opaque box AI or machine learning techniques are difficult or impossible to interpret. The lack of interpretability may be overlooked in various situations, including, for example, if the model's performance exceeds that of more interpretable models. However, the lack of interpretability will make it even more difficult to determine potential effects beyond the seen data. It could be the case that many AI and machine learning developed models could be 'trained' in a period of low volatility [2]. As such, the models may not suggest optimal actions in a significant economic downturn or in a financial crisis, or the models may not suggest appropriate management of long-term risks.

Hence, as stressed by the Financial Stability Board [2], it is important that progress in AI and machine learning applications be accompanied with further progress in the interpretation of algorithms' outputs and decisions. Efforts to improve the interpretability of AI and machine learning may be important conditions not only for risk but also for greater trust from the general public as well as regulators and supervisors in critical financial services [2].

An 'Explainable AI (XAI)' or 'Transparent/Interpretable AI' is an artificial intelligence (AI) system whose outputs can be easily understood by humans. It contrasts with "black/opaque box" AIs that employ complex opaque algorithms, where even their designers cannot explain why the AI arrived at a specific decision [4]. XAI can be used to implement a social right to explanation [9]. Transparency rarely comes for free; there are often tradeoffs between how "smart" an AI is and how transparent it is, and these tradeoffs are expected to grow larger as AI systems increase in internal complexity. The technical challenge of explaining AI decisions is sometimes known as the interpretability problem [9]. AI systems optimize behaviour to satisfy a mathematically-specified goal system chosen by the designers, such as "maximize accuracy of assessing how positive film reviews are in the test dataset". The AI may learn useful general rules from the training set. A human can audit rules in an XAI to get an idea how likely the system is to generalize to future real-world data outside the training set [9].

Human users should be able to understand the AI's cognition (both in real-time and after the fact) and should be able to determine when to trust the AI and when to distrust the AI [10], [11]. Being able to explain its decision-making is necessary for AI to be fully embraced and trusted by industry [4].

The invention disclosed herein addresses the above-mentioned challenges and present novel XAI mechanisms which can be plugged to any AI mechanism where the presented mechanisms have the potential ability to explain a given AI mechanism decision, characterise their strengths and weaknesses, and convey an understanding of how they will behave in the future. Importantly the mechanisms also translate models into understandable and useful explanations for end users.

Although it is often impossible for an explanation to be completely faithful unless it is the complete description of the model itself, for an explanation to be meaningful it must at least be locally faithful, i.e. it must correspond to how the model behaves in the vicinity of the instance being predicted. As mentioned in [12], local fidelity does not imply global fidelity; features that are globally important may not be important in the local context, and vice versa.

While there are models that are inherently interpretable, an explainer should be able to explain any model, and thus be model-agnostic (i.e. treat the original model as a black box). An interpretable explanation needs to use a representation that is understandable to humans, regardless of the actual features used by the model [12].

In [12] a method is presented to explain a prediction by sampling the input feature space around the instance to be explained. The sampled points are "close" to the original one, in order to capture and maintain local fidelity and meaning. In addition, the contribution of each point is weighted according to some distance metric capturing "how far away" the samples are from the explanation point. It is worth noting that due to this weighting the method is fairly robust to sampling noise. This technique to generate a local model which is to be trained with those artificial samples and this opaque model to be explained [12].

In [12], sparse linear explanations are used, which lack the explanation of the interconnection between different variables driving the given decision. In [13], the same authors of [12] mentioned that explanations such as sparse linear models (called LIME) or gradients can still exhibit high precision and low effort even for very complex models by providing explanations that are local in their scope. However, the coverage of such explanations is not explicit, which may lead to human error. As an example, consider a method to explain a prediction of a complex model, which predicts that a given person earns less than $50K per year. The LIME explanation sheds some light into why, but it is not clear whether the insights from this explanation can be applied to other instances [13]. In other words, even if the explanation is faithful locally, it is not easy to know what that local region is and how much it extends. Furthermore, it is not clear when the linear approximation is more or less faithful, even within the local region.

Hence in [13], what is referred to as "Anchor Local Interpretable Model-Agnostic Explanations" (aLIME) is introduced, a system that explains individual predictions with crisp IF-THEN logic rules in a model-agnostic manner. As mentioned in [13], such IF-THEN rules are intuitive to humans, and usually require low effort to comprehend and apply. In particular, an aLIME explanation is a rule that sufficiently "anchors" a prediction—such that changes to the rest of variables from the instance not participating in the anchor rule do not matter (with high probability). For example, the anchor in this example might state that the model utilized will almost always predict Salary<$50K if a person is not educated beyond high school, regardless of the other features. It has been shown in [13] that the proposed approach outperforms the linear-based LIME Model presented in [12]. However, the IF-THEN anchor model presented in [13] uses crisp logic and thus struggles with variables which do not have clear crisp boundaries, like income, age, etc. Also, the approach in [13] is not able to handle models generated from a large number of inputs. Furthermore, explaining the prediction with just an anchor IF-THEN rule does not give a full picture about the outcome: there is no guarantee that such an anchor exists in the context of the instance to explain, and no method to compute it is provided. As an example, considering classification problems, there are always positive and negative drivers for any decision (like pros and cons): if someone is predicted to earn<$50K and the model score is marginal, the positive drivers might be: "B.Sc. education level" and "3-4 years' experience", whereas negative indicators could be: "young age", "working experience is in irrelevant industries" and no "flexibility to travel".

SUMMARY OF THE INVENTION

In a first aspect, there is provided a method of determining and explaining an artificial intelligence, AI, system employing an opaque model from a local or global point of view the local explainer method comprising the steps of:
providing an input data point and its corresponding output of the opaque model;
sampling the opaque model around the input data point to generate training data samples;
performing feature selection to determine dominant features;
training the Type-2 FLM with the generated training data samples; and
feeding the input data point into the Type-2 FLM to provide an explanation of the output from the opaque model considering a local point of view Advantageously, the provided output is interpretable by a human. Moreover, because the sampling step is performed around a specific instance (the input), the method captures the local behavior of the opaque model in such vicinity.

By a Type-2 FLM (also referred to as Fuzzy Logic Systems, FLS), we mean a system which employs type-2 fuzzy logic as described in section 4.3 (with reference to FIG. 4) below.

In a dependent aspect, the method further comprises the step of computing a distance between the input data point and another data point comprised in the generated training data samples. In a further dependent aspect, the method further comprises the step of generating, using the computed distance, and deriving a weight for the sampled data point.

In a dependent aspect, sampling the opaque model comprises, for each sample:
S1: Setting a sample value z equal to the input x;
S2: Providing a randomly generated number N, where N is between 1 and Nf (the total number of features) and represents the number of features to be changed;
S3. Changing each chosen feature value randomly; and repeating steps S1 to S3 for each sample.

In a dependent aspect, performing feature section comprises using step-wise linear regression feature selection.

In a dependent aspect, the method further comprises the step of resampling by repeating the step of sampling the opaque model around the input, using only the determined dominant features, to generate secondary training data sample.

In a dependent aspect, generating the Type-2 Fuzzy Logic Model, FLM comprises:
  generating a Restricted Universe of Rules, UoR;
  pruning the UoR; and
  applying a genetic algorithm to determine a subset of rules from the initial set of rules.

In a second aspect, there is provided a system for determining and explaining an artificial intelligence, AI, system employing an opaque model from a local or global point of view, the local explainer system comprising the steps of:
  providing an input and a corresponding output of the opaque model;
  sampling the opaque model around the input to generate training data samples;
  performing feature selection to determine dominant features;
  sampling again the opaque model around the original input, using only the dominant features;
  training the Type-2 FLM with the second training data sample; and
  feeding the input into the Type-2 FLM to provide an explanation of the output from the opaque model from a local point of view.

In a further aspect, for the global surrogate explainer, there is provided a method of determining and explaining artificial intelligence, AI, system employing an opaque model, comprising the steps of:
  training a Type-2 FLM with training data samples comprised of the input data and the opaque model's output; and
  feeding any input into the Type-2 FLM to provide an explanation of the opaque model and its output from a global point of view.

For the global surrogate explainer, there is also provided a system for determining and explaining an artificial intelligence, AI, system employing an opaque model, the opaque model suitable for processing an input and providing a corresponding output; the system comprising a processor adapted to perform the steps of:
  training the Type-2 FLM with the training data samples, comprised of input data and the opaque model's outputs; and
  feeding any input data point into the Type-2 FLM to provide an explanation of the opaque model and its output from a global point of view.

In a dependent aspect, generating the Type-2 Fuzzy Logic Model, FLM comprises:
  generating a Restricted Universe of Rules, UoR;
  pruning the UoR;
  applying a genetic algorithm to determine a subset of rules from the initial set of rules.

Preferred features of each one of the independent aspects are provided in the dependent claims.

BRIEF DESCRIPTION OF THE DRAWINGS

Aspects of the present invention will now be described, by way of example only, with reference to the accompanying figures:

FIG. 3 (*b*) shows an interval type-2 fuzzy set secondary MF at a specific point $x^i$.

DETAILED DESCRIPTION OF THE INVENTION

Glossary and Notation

Figure 1:
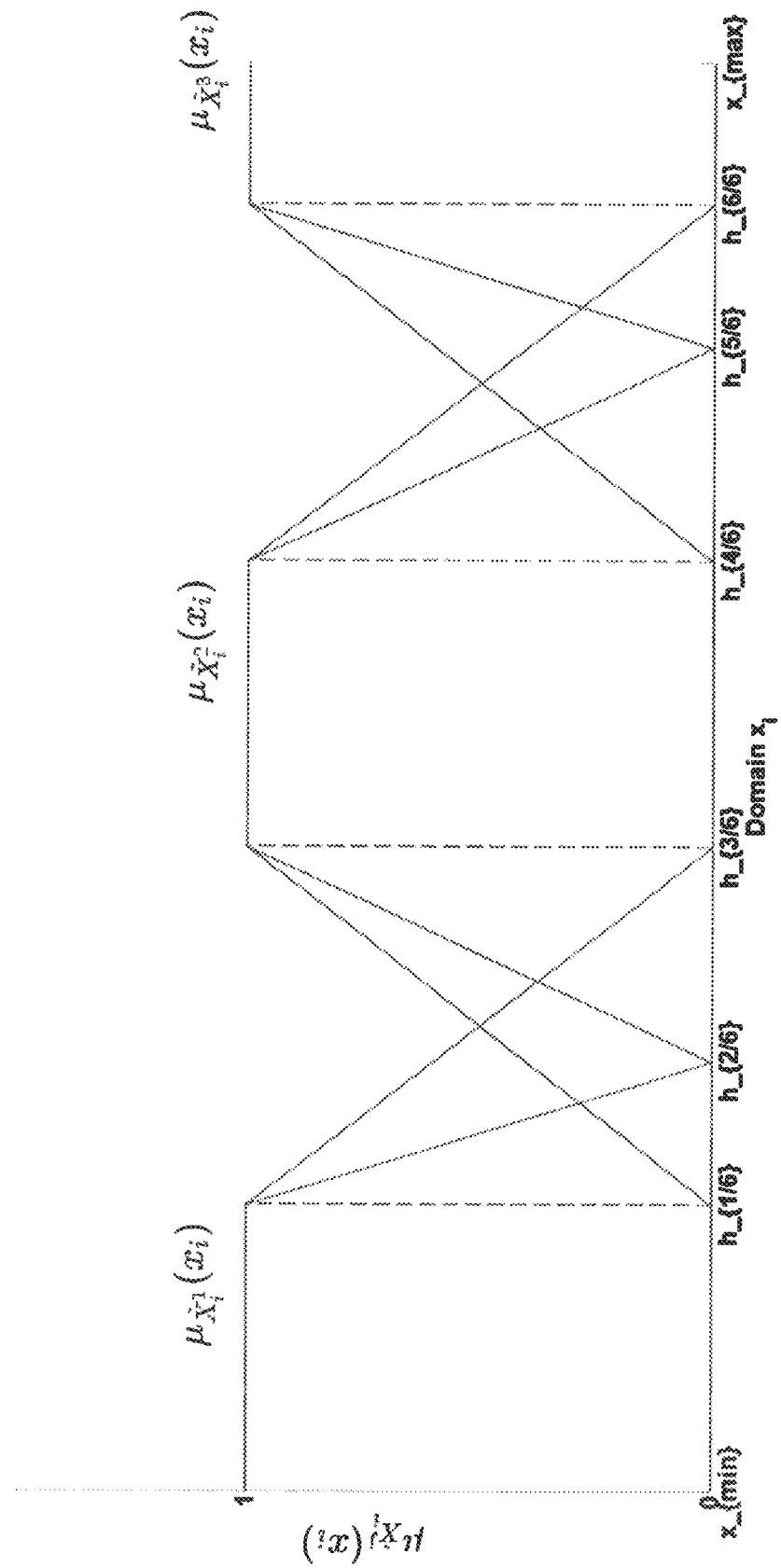
FIG. 1 shows examples of interval type-2 (IT2)fuzzy sets for continuous features.

1. In general, a feature vector will be denoted as x or $\vec{x}$ (or a different lower-case letter), whereas each of its individual components will be referred to as $x_i$, with i=1, 2, . . . , I, I being the dimension of such vector.
2. When referring to a specific instance in the context of a dataset it may be denoted as $\vec{x}p$, and its components as $\vec{x}_{p,i}$.
3. The feature space to which a vector $\vec{x}$ belongs will be denoted as X.
4. Output values for input $\vec{x}_p$ will be denoted as $y_p$ in general; sometimes, to be more specific, $C_p$ might be used to more specifically denote classes.
5. A dataset D will be comprised of P instances, of the form $(\vec{x}_p, C_p)$ for classifiers and $(\vec{x}_p, y_p)$ for continuous problems, =1, . . . , P.
6. In a classifier, the output $y_p$ of input vector $\vec{x}_p$ belongs to a given class $C_k$, k=1, . . . , K, K being the number of classes. That can be characterised by the following crisp membership function:

$$\mu_{C_k}(y_p) = \begin{cases} 1 & \text{if } y_p \in C_k \\ 0 & \text{otherwise} \end{cases} \quad (1)$$

Hence, in a classification problem, the data split for class $C_k$ is defined as:

$$DS^{C_k} = \frac{\sum_{i=1}^{P} \mu_{C_k}(y_p)}{\sum_{i=1}^{P}\sum_{j=1}^{K} \mu_{C_j}(y_p)} = \frac{\sum_{i=1}^{P}}{P} \quad (2)$$

As $\Sigma_{i=1}^{P}\mu_{c_k}(y_p)=1$ for every $y_p$ as each outputs belongs to a class 7. In a continuous output problem, Equation (2) can be extended from classes to fuzzy sets representing linguistic labels. If $\mu Y_k(y_p)$ represents the membership function of one of the output linguistic labels (typically low, medium or high), then the fuzzy data split for linguistic label $Y_k$ is represented by:

$$DS^{Y_k} = [\underline{DS}^{Y_k}, \overline{DS}^{Y_k}] \quad (3)$$

8. A fuzzy rule $R^l$ pointing to a class $C_k$ or a fuzzy set/linguistic label $Y_k$ is denoted as one of the following:

$$R^l \to C_k \quad (4)$$

$$R^l \to Y_k \quad (5)$$

9. Given an interval $A=[a_l, a_r]$, then $\hat{A}$ will denote its midpoint $$\frac{(a_l + a_r)}{2}.$$

10. Usually, the opaque or original model will be denoted as $f(\vec{x})$, whereas any other local or surrogate models will typically be denoted as $g(\vec{x})$ or $g(\vec{z})$.
11. In the context of a fuzzy logic rule, a statement of the form "IF feature $x_i$ is $X_i^j$" is called a premise, where $X_i^j$ is a category/linguistic label associated to the feature.
12. One or more premises can be combined to form the antecedent of a fuzzy rule.

4. Preliminaries
4.1 the Linguistic Labels for Input Features

Three different types of features will be considered. Each of them will be associated with linguistic labels in order to obtain interpretable fuzzy rules expressed in linguistic terms. In the following subsections we will itemize how the different linguistic labels for each feature will be created.

4.1.1 Continuous Features

Figure 2:
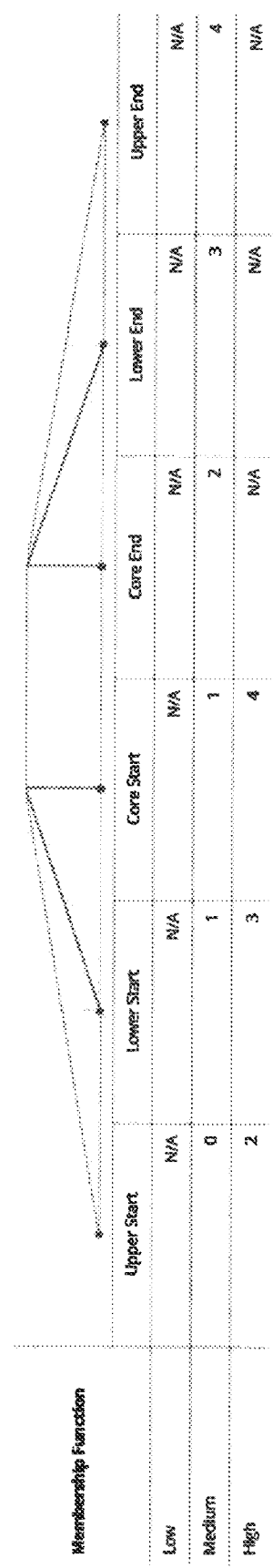
FIG. 2 is an exemplary representation of fuzzy sets for continuous features.

These are entirely numerical features, containing no blanks or any other distinct category. By default, these features will be associated with 3 linguistic labels (a higher number is configurable). The associated Interval Type 2 Fuzzy Sets (IT2 FSs) representing these linguistic labels are obtained as follows:
 1. The feature is sorted in ascending order.
 2. The sorted vector is divided in heptiles, each of these containing 1/7-th of the data. This heptiles are determined by six points, denoted $h_{1/6}$ to $h_{6/6}$.
 3. The IT2 FSs for the j-th fuzzy set (as shown in FIG. 1 and FIG. 2) of the i-th input, j=1, 2, 3 in the example, are given by:

$$\mu_{\tilde{X}_i^j}(x_i) = [\underline{\mu}_{\tilde{X}_i^j}(x_i), \overline{\mu}_{\tilde{X}_i^j}(x_i)] \quad (6)$$

If the feature is desired to contain a different number of linguistic labels or fuzzy sets, the appropriate number of quantiles is obtained in order to create such sets in an analogous manner as described above.

$$\underline{\mu}_{\tilde{X}_i^1}(x_i) = \begin{cases} 1 & x_{i,min} \le x_i \le h_{1/6} \\ \frac{h_{2/6} - x}{h_{2/6} - h_{1/6}} & h_{1/6} \le x_i \le h_{2/6} \\ 0 & \text{otherwise} \end{cases} \quad (7)$$

$$\overline{\mu}_{\tilde{X}_i^1}(x_i) = \begin{cases} 1 & x_{i,min} \le x_i \le h_{1/6} \\ \frac{h_{3/6} - x}{h_{3/6} - h_{1/6}} & h_{1/6} \le x_i \le h_{3/6} \\ 0 & \text{otherwise} \end{cases} \quad (8)$$

$$\underline{\mu}_{\tilde{X}_i^2}(x_i) = \begin{cases} \frac{x - h_{2/6}}{h_{3/6} - h_{2/6}} & h_{2/6} \le x_i \le h_{3/6} \\ 1 & h_{3/6} \le x_i \le h_{4/6} \\ \frac{h_{5/6} - x}{h_{5/6} - h_{4/6}} & h_{4/6} \le x_i \le h_{5/6} \\ 0 & \text{Otherwise} \end{cases} \quad (9)$$

$$\overline{\mu}_{\tilde{X}_i^2}(x_i) = \begin{cases} \frac{x - h_{1/6}}{h_{3/6} - h_{1/6}} & h_{1/6} \le x_i \le h_{3/6} \\ 1 & h_{3/6} \le x_i \le h_{4/6} \\ \frac{h_{6/6} - x}{h_{6/6} - h_{4/6}} & h_{4/6} \le x_i \le h_{6/6} \\ 0 & \text{Otherwise} \end{cases} \quad (10)$$

$$\underline{\mu}_{\tilde{X}_i^3}(x_i) = \begin{cases} \frac{x - h_{5/6}}{h_{6/6} - h_{5/6}} & h_{5/6} \le x_i \le h_{6/6} \\ 1 & h_{6/6} \le x_i \le x_{i,max} \\ 0 & \text{otherwise} \end{cases} \quad (11)$$

$$\overline{\mu}_{\tilde{X}_i^3}(x_i) = \begin{cases} \frac{x - h_{4/6}}{h_{6/6} - h_{4/6}} & h_{4/6} \le x_i \le h_{6/6} \\ 1 & h_{6/6} \le x_i \le x_{i,max} \\ 0 & \text{otherwise} \end{cases} \quad (12)$$

4.1.2 Categorical Features

Categorical features are those which can only take a finite number of distinct crisp values. Say $x_1$ is a categorical feature with $J_i$ distinct values:

$$x_i \in X_i | X_i = \{x_i^1 \ldots x_i^{J_i}\} \quad (13)$$

Then feature $x_i$ will have $J_i$ distinct membership functions $\mu_{\tilde{X}_i^j}(x_i)$, j=1, ..., $J_i$, given by:

$$\mu_{\tilde{X}_i^j}(x_i) = \begin{cases} [1, 1] & \text{if } x_i = x_i^j \\ [0, 0] & \text{otherwise} \end{cases} \quad (14)$$

Equation (14) is equivalent to the membership value of a crisp set but using IT2 notation. Each of these membership functions can be a premise within the antecedent of a rule in the rule base.

4.1.3 Mixed Features

Mixed features are those that can contain simultaneously numerical and categorical values; i.e., if feature $x_i$ has a continuous part and a set of $J_i$ categorical values (denoted $x_i^j$, $j=1, \ldots, J_i$), then:

$$x_i \in X_i | X_i = [x_{i,min}, \ldots, X_{i,max}] U \{x_i^1, \ldots, x_i^{J_i}\} \quad (15)$$

Mixed features combine both continuous and categorical fuzzy sets/linguistic labels.

4.1.4 the do-not-Care Linguistic Label

Each of the different features described in the previous subsections will be considered to $(X_i^{Don'tcare} = X_i^{DC})$ have an additional related linguistic label, which is intended to be used just for notation purposes. This linguistic label will be referred to as Don't care and is intended to be included in a rule when a given feature is not participating in it. Therefore, it follows that:

$$X_i^{DC} \Leftrightarrow \mu_{X_i^{DC}(x_i)} = [1,1] \forall x_i \quad (16)$$

4.2 Interval Arithmetic

Across this document operations between intervals will be used frequently; because the definition of interval arithmetic is not standard and can be defined in many different ways, it is worthwhile specifying the operations that will be used in the fuzzy estimator implementation. These operations, which are mostly extracted from [14], will be presented in the following subsections.

4.2.1 Addition

Let $A=[a_l, a_r]$, $B=[b_l, b_r]$ be two intervals, such that $a_l, a_r, b_l, b_r \in IR$ and $a_l \leq a_r$, $b_l \leq b_r$. Then:

$$A+B = [a_l, a_r] + [b_l, b_r] = [a_l+b_l, a_r+b_r] \quad (17)$$

4.2.2 Subtraction

When working with real numbers, subtraction is defined axiomatically by means of opposite element of a real number with respect to the neutral element for addition, 0. Let $a \in IR$ be a real number; hence, its opposite element with respect to 0, $-a$, is such that:

$$a + (-a) = 0 \quad (18)$$

From this definition, the subtraction $a-b$ of two real numbers is defined as the addition between $a$ and the opposite element of $b$, say $-b$:

$$a - b = a + (-b) \quad (19)$$

It is easy to generalize the concept of neutral element with respect to addition for intervals. Let $A=[a_l, a_r]$, $a_l \leq a_r$, $a_l, a_r \in IR$ be an interval; then it is easy to define $[0, 0]$ as such neutral element:

$$A + [0,0] = [a_l, a_r] + [0,0] = [a_l, a_r] \quad (20)$$

Nonetheless, this neutral element cannot be used to define an opposite element:

$$A - A = A + (-A) = [0,0] \to [a_l, a_r] + [-a_l, -a_r] = [0,0] \quad (21)$$

However, because $a_l \leq a_r \to -a_l \geq -a_r$ and, thus, $[-a_l, -a_r]$ is not even an interval.

Consequently, subtraction has to be defined from scratch. As defined in [14], in order to guarantee the ordering between the extremes, subtraction between two intervals is as in the following equation $$A - B = [a_l, a_r] - [b_l, b_r] = [a_l - b_r, a_r - b_l] \quad (22)$$

4.2.3 Product

The product operation between two intervals A and B is well established in the literature [15][14][16], and is defined as follows:

$$A*B = [a_l, a_r] * [b_l, b_r] = [\min(a_l*b_l, a_l*b_r, a_r*b_l, a_r*b_r), \max(a_l*b_l, a_l*b_r, a_r*b_l, a_r*b_r)] \quad (23)$$

4.2.4 Division

Division is the only basic operation on intervals for which there is no consensus in the literature [14]. In general, a well-accepted interval division operation [16][15] is described as follows:

$$\frac{A}{B} = \frac{[a_l, a_r]}{[b_l, b_r]} = [\min(S), \max(S)] \quad (24)$$

Where:

$$S = \left\{ \frac{a_l}{b_l}, \frac{a_l}{b_r}, \frac{a_r}{b_l}, \frac{a_r}{b_r} \right\} \quad (25)$$

Equation 24 is valid even for intervals containing the value 0, as long as $b_l, b_r \neq 0$. From a theoretical point of view, certain implementations of the interval arithmetic [14], which accept $\pm\infty$ as valid extremes, solve the issue accepting such values.

In our case, it is quite common to divide by an interval of the form $[0, a]$, $a > 0$ (usually related to firing strengths, confidences or dominances); hence, Equation 24 is slightly modified to include this specific case:

$$\frac{A}{B} = \frac{[a_l, a_r]}{[b_l, b_r]} = \begin{cases} [\min(S), \max(S)] & \text{if } b_l \neq 0 \cap b_r \neq 0 \\ \frac{[a_l, a_r]}{\left(\frac{b_l + b_r}{2}\right)} & \text{if } b_l = 0 \cup b_r = 0 \end{cases} \quad (26)$$

Although Equation 26 reduces the amount of uncertainty associated with a normal interval division (we are just dividing the numerator by the midpoint of the denominator), it solves the problem of not having the operation defined for some cases.

4.3 Overview of Type-2 Fuzzy Logic Classifier

Fuzzy Logic Systems and classifiers (FLSs and FLCs) have been credited with providing transparent models which can handle uncertainty and imprecision. However, the vast majority of them were based on type-1 fuzzy logic systems which cannot fully handle or accommodate the uncertainties associated with changing and dynamic environments. Type-1 fuzzy sets handle the uncertainties associated with the FLS inputs and outputs by using precise and crisp membership functions [17]. Once the type-1 membership functions have been chosen, all the uncertainty disappears, because type-1 membership functions are totally precise [17][18].

The uncertainties associated with real world environments cause problems in determining the exact and precise antecedent and consequent membership functions during the FLS/FLC design. Moreover, the designed type-1 fuzzy sets can be sub-optimal for given environment conditions. However due to the change in the individual engineer circumstances and the uncertainties present in the surrounding environments, the chosen type-1 fuzzy sets might not be appropriate anymore. This can cause degradation in the system performance and time being wasted in frequently redesigning or tuning it so that it can deal with the various uncertainties faced. Type-2 FLSs/FLCs which employ type-2 fuzzy sets can handle such high levels of uncertainties to give very good performances.

Figure 3:
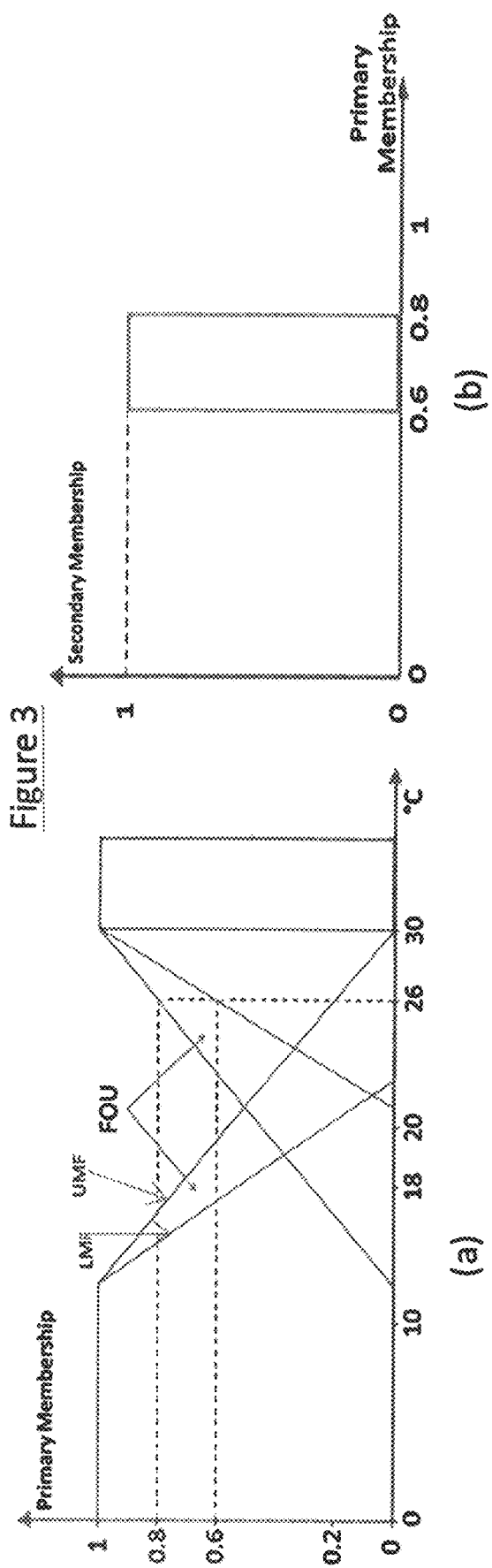
FIG. 3 (*a*) shows an interval type-2 fuzzy set-primary membership function.

A type-2 fuzzy set is characterized by a fuzzy membership function, i.e., the membership value (or membership grade) for each element of this set is a fuzzy set in [0, 1], unlike a type-1 fuzzy set where the membership grade is a crisp number in [0, 1][18]. The membership functions of type-2 fuzzy sets are three dimensional and include a Footprint Of Uncertainty (FOU); it is the new third-dimension of type-2 fuzzy sets and such FOU that provide additional degrees of freedom that make it possible to directly model and handle uncertainties [17][18]. As shown in FIG. 3(a), the Interval Type-2 (IT2) fuzzy set $\tilde{A}$ can be represented in terms of the Upper Membership Function (UMF) (denoted by $\bar{\mu}_{\tilde{A}}(x)$, $\forall x \in X$) and the Lower Membership Function (LMF) (denoted by $\underline{\mu}_{\tilde{A}}(x) \in X$) as follows:

$$\tilde{A} = \int_{x \in X} \left[ \int_{u \in [\underline{\mu}_{\tilde{A}}(x), \bar{\mu}_{\tilde{A}}(x)]} 1/u \right] / x \quad (27)$$

The UMF and LMF are boundaries for the FOU ($\tilde{A}$) on an IT2 fuzzy set $\tilde{A}$. As shown in FIG. 3(b), in an IT2FS the secondary membership function is equal to 1 for all the points in the primary membership $\forall x \in X$.

Figure 4:
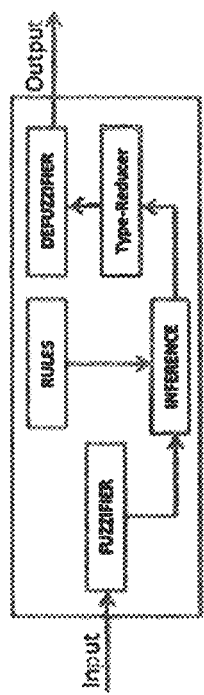
FIG. 4 shows an example of a type 2 fuzzy logic systems and classifier, FLS/FLC (from J. M. Mendel, R. I. John, and F. Liu, "Interval type-2 fuzzy logic systems made simple," *IEEE Transactions on Fuzzy Systems*, vol. 14, no. 6, Dec. 2006).

FIG. 4 shows an overview on the type-2 FLS/FLC where the crisp inputs are fuzzified to input type-2 fuzzy sets, which are then fed to the inference engine. The inference engine maps the input type-2 fuzzy sets to output type-2 fuzzy sets using the rule base and the fuzzy reasoning method. The output set is then processed by the type-reducer and the defuzzifier section to generate an output. More information regarding the interval type-2 FLS/FLC and its applications can be found in [17], [18] and [19].

In addition to this general overview, in this section the following concepts are introduced:
Rule structure and rule bases.
Rule metrics.
Fuzzy Reasoning Method (FRM).
A similarity-based mechanism to provide inference when no rules are fired.

4.3.1 Rule Structure and Rule Bases

The structure of fuzzy rules used in this fuzzy classifier are not standard, in the sense that are not similar to the rules used in function approximation [15] nor to the ones used in classification problems [19].

In our Fuzzy Estimator approach, the l-th rule of the system, denoted as $R^l$, will be as follows:

$$R^l: \text{IF } x_1 \text{ is } X_1^{R^l} \text{ AND} \ldots \text{AND } x_I \text{ is } X_I^{R^l} \text{Then } y \text{ is } C_k \text{ with } RW_{R_l}^{C_k} \quad (28)$$

Where $x_i$ are the different input features, $X_i^{R^l} \in T_x$ is the linguistic label for feature $x_i$ participating in the l-th rule, y is the output variable, and $RW_{R^l}^{C_k}$ is the rule weight associated to the l-th rule, which is pointing to the output class $C_k$.

Although in terms of the antecedent part Equation (28) represents a canonical (or complete) fuzzy rule involving all features, in general we will use shorter versions, meaning not all the features will participate in every rule (referred to as incomplete if rules in the literature [15]). As an example, say features q, r and t, q, r, t ∈ [1,I] are participating in the l-th rule, then $$R^l: \text{IF } x_q \text{ is } X_q^{R^l} \text{ AND} \ldots \text{AND } x_r \text{ is } X_r^{R^l} \text{ AND } x^t \text{ is } X_t^{R^l} \text{ Then } y \text{ is } C_k \text{ with } RW_{R_l}^{C_k} \quad (29)$$

Nonetheless, an incomplete IF-THEN rule can be expressed in the canonical way just using the Don't care antecedent described in Section 4.1.4 for all those features not participating in the rule. Considering this, therefore, we will stick to Equation (28) for notation simplicity.

A rule base will be comprised of a set of L rules as in Equation (28).

4.3.2 Rule Metrics

In this section some metrics to characterise rules are introduced.

In this section some metrics to characterise rules are introduced.

Definition 1: Let $R^l$ be a fuzzy IF-THEN rule defined over the universe of discourse $\vec{X} = X_1 \times \ldots \times X_1$, and characterized by its firing strength at $\vec{x}_p$ by its membership degree $\mu_{R^l}(\vec{x}_p) = [\underline{\mu}_{R^l}(\vec{x}_p), \bar{\mu}_{R^l}(\vec{x}_p)]$, where $\underline{\mu}_{R^l}(\vec{x}_p), \bar{\mu}_{R^l}(\vec{x}_p) \in [0,1]$ and $\underline{\mu}_{R^l}(\vec{x}_p) \leq \bar{\mu}_{R^l}(\vec{x}_p)$. Let D be a dataset as specified in Section 3. Then, the fuzzy support of rule $R^l$ is defined as:

$$S_{R^l} = \frac{\sum_{p=1}^{P} \mu_{R^l}(\vec{x}_p)}{P} \quad (30)$$

Definition 2: Let D be a dataset as described in Section 3, and let $R^l$ be a fuzzy IF-THEN rule as in equation (28). Then, the fuzzy confidence of rule $R^l$ towards class $C_k$ is defined as:

$$r_{R^l}^{C_k} = \frac{\sum_{y_p \in C_k} \mu_{R^l}(\vec{x}_p)}{\sum_{p=1}^{P} \mu_{R^l}(\vec{x}_p)} \quad (31)$$

Definition 3: Let D be a dataset and $R^l$ a given IF-THEN rule, respectively, as described previously. Then the rule score, rule weight or dominance of rule $R^l$ towards class $C_k$ is computed using the fuzzy support and fuzzy confidence, and is represented by:

$$RW_{R^l}^{C_k} = [\underline{RW}_{R^l}^{C_k}, \overline{RW}_{R^l}^{C_k}] \quad (32)$$

4.3.3 Fuzzy Reasoning Method for Classifiers

In this section we will describe the mathematical method to compute the output class $y_p = C_k$ estimated for a given input vector $\vec{x}$ in the context of an IT2 fuzzy logic classifier. It is worthwhile to highlight and bear in mind that, as we are dealing with an IT2 FLS, all fuzzy membership values will be intervals and, thus, the interval arithmetic described in Section 4.2 will be used.

The procedure to compute the output given a rule-base of L rules will be as follows:
1. Compute the firing strength for each rule l=1, . . . L, i.e.:

$$\mu_{R^l}(\vec{x}) = T_{i=1}^{I} \mu_{X_i^{R^l}}(x_i) \quad (33)$$

Where $\mathcal{T}$ represents a t-norm (product in our case) and $X_i^{R^l} \in T_{x_i}$ is the linguistic label of the i-th feature participating in the l-th rule.

2. For those rules that have actually been fired, i.e., whose firing strength is different from [0, 0], compute the rule vote as follows:

$$\text{Vote}(R^l) = \mu_{R^l}(\vec{x}_p) \cdot RW_{R^l}^{C_k} \quad (34)$$

3. Using the votes computed for each rule, compute the vote for each class as follows:

$$\text{Vote}(C_k) = \sum_{R^l \to C_k} \text{Vote}(R^l) \quad (35)$$

4. Choose the final class $C_p$ for input instance $\vec{x}_p$ as:

$$C_p = \max_k \{\text{Vote}(C_k)\} \quad (36)$$

4.3.4 Similarity Metric: What to do when No Rules are Fired

A potential problematic situation that may arise during system's operation is a new instance not firing any rule. This happens when a specific region of the input space had no samples for the training set, or it had so few that their support was not enough to conform a fuzzy rule of its own. Therefore, a mechanism to handle this situation is required, as the system should always provide an output for any input instance.

In actual fuzzy logic libraries implementations, the lack of fired rules for a given instance is usually handled by providing the most common class as the system's output value. Our approach will be different depending on whether we are training the system or not.

When training the system, if a new input instance doesn't fire any rule, it will be considered as a misclassification.

Consider the following example, in which the dataset has I=4 features, $x_1$ to $x_4$. In this example, L, M and H will denote Low, Medium and High for continuous features, whereas $C^j$ will denote the j-th category for the i-th feature, which is categorical. Assuming the following instance did not match any rule:

TABLE 1

Example of an instance not firing any rule.

| $x_1$ | $x_2$ | $x_3$ | $x_4$ |
|---|---|---|---|
| $X_1^L/X_1^M$ | $C_2^2$ | $C_3^4$ | $X_4^M/X_4^H$ |

Hence, the synthetic rules created from this instance would be:

IF $x_1$ is $X_1^L$ AND $x_2$ is $C_2^2$ AND $x_3$ is $C_3^4$ AND $x_4$ is $X_4^M$

IF $x_1$ is $X_1^M$ AND $x_2$ is $C_2^2$ AND $x_3$ is $C_3^4$ AND $x_4$ is $X_4^M$

IF $x_1$ is $X_1^L$ AND $x_2$ is $C_2^2$ AND $x_3$ is $C_3^4$ AND $x_4$ is $X_4^H$

IF $x_1$ is $X_1^M$ AND $x_2$ is $C_2^2$ AND $x_3$ is $C_3^4$ AND $x_4$ is $X_4^H$ (37)

For each of those rules, the most similar rule existing in the rule base is found. In order to do so, the definition of similarity between rules needs to be introduced.

Definition 4: Let $R^a$ and $R^b$ be two fuzzy IF-THEN rules as described in Equation 28, it is, complete rules using the Don't care premise/linguistic label for those features not participating in it. Hence, the similarity between $R^a$ and $R^b$ is defined by.

$$\text{Sim}(R^a, R^b) = \prod_{i=1}^{I} D(X_i^{j_a,i}, X_i^{j_b,i}) \quad (38)$$

Where:

$$D(X_i^{j_1}, X_i^{j_2}) = \begin{cases} 1 & \text{if } X_i^{j_1} = \text{Don't care} \cup X_i^{j_2} = \text{Don't care} \\ 1 & \text{if } X_i^{j_1}, X_i^{j_2} \neq \text{Don't care} \cap x_i \text{ is categorical} \cap j_1 = j_2 \\ 0.5 & \text{if } X_i^{j_1}, X_i^{j_2} \neq \text{Don't care} \cap x_i \text{ is categorical} \cap j_1 \neq j_2 \\ 0.5 & \text{if } X_i^{j_1} \text{ is categorical} \cap X_i^{j_2} \text{ is continuous (mixed features)} \\ 1 - \frac{|j_1 - j_2|}{NL_i} & \text{if } X_i^{j_1}, X_i^{j_2} \text{ are continuous} \end{cases} \quad (39)$$

When in normal operation, a non-covered instance will activate the similarity-based inference, which will be described in the following.

The first step to compute the output of a non-covered instance is generating a set of synthetic rules for that instance. The procedure works as follows [20]:

For each feature, the membership functions having a non-zero degree of activation are obtained.

Then, all possible combinations of activated linguistic labels per feature are found, having one label per feature.

All these combinations are stored as synthetic rules, which lack any consequent or rule weight. The length of these synthetic rules will be I, the number of features in the dataset.

Where $NL_i$ is the number of linguistic labels for feature $x_i$. It is important to highlight that, for categorical features (and the separated categories for mixed ones) the subscripts $j_1$ and $j_2$ have no concept of ordering; these numbers may be assigned randomly, or in order of appearance in the dataset. However, for continuous features, there is a natural ordering between the linguistic labels. For instance, if a continuous feature $x_1$ has three linguistic labels, namely Low, Medium and High, then $X_i^1$=Low, $X_i^2$=Medium and $X_i^3$=High. This needs to be considered when using the last case of Equation (39).

Once the synthetic rule base described above has been created (an example is shown in Equation (37)), we find the most similar rule existing in the rule base for each one of them, according to the similarity metric in this Section 4.3.4 and Equation (38). Then, we will compute the output of the system as if those most similar rules had been fired, using the standard FRM described in Section 4.3.3.

4.4 Overview of Type-2 Fuzzy Logic System with Continuous Output

This section is completely analogous to 4.3 but related to fuzzy logic systems with continuous output. Therefore, we will cover:

- Rule structure and rule bases.
- Rule metrics.
- Fuzzy Reasoning Method (FRM).
- A similarity based mechanism to provide inference when no rules are fired.

4.4.1 Rule Structure and Rule Bases

As in the case of classifiers presented in Section 4.3.1, rules used in this fuzzy system with continuous output approach are not standard either. In this case, the l-th rule of the system, denoted as $R^l$, will be as follows:

$$R^l: IF\ x_1\ is\ X_1^{R^l}\ AND\ \ldots\ AND\ x_I\ is\ X_I^{R^l}\ THEN\ y\ is\ C(Y_k)\ with\ RW_{R^l}^{Y_k} \quad (40)$$

Where $x_i$ are the different input features, $X_i^{R^l} \in T_{x_i}$ is the linguistic label for feature $x_i$ participating in the l-th rule, y is the continuous output variable, and $RW_{R^l}^{Y_k}$ is the rule weight associated to the l-th rule, which is pointing to the output linguistic label $Y_k$, represented in the rule by its centroid $C(Y_k)$.

As presented for the classifier, Equation (40) represents a canonical (or complete) fuzzy rule involving all features; a shorter version of a rule involving features q, r and t, q, r, t ∈ [1, I] would be:

$$R^l: IF\ x_q\ is\ X_q^{R^l}\ AND\ x_r\ is\ X_r^{R^l}\ AND\ x_t\ is\ X_t^{R^l}\ THEN\ y\ is\ C(Y_k)\ with\ RW_{R^l}^{Y_k} \quad (41)$$

Nonetheless, the complete notation can be used considering the Don't care antecedent described in Section 4.1.4 for all those features not participating in the rule. Considering this, therefore, Equation (40) will be adhered to for notation simplicity.

A rule base will be comprised of a set of L rules as in Equation (41).

4.4.2 Rule Metrics for Continuous Output Systems

In this section some metrics to characterise rules are introduced. Because the scope is different, and we are considering a fuzzy logic system with continuous output, these definitions are slightly different from the ones presented in Section 4.3.2 for fuzzy classifiers.

Definition 5: Let D be a dataset as described in Section 3, and let $R^l$ be a fuzzy IF-THEN rule as in Equation (40). Then, the fuzzy confidence of rule $R^l$ towards the linguistic label $Y_k$ is defined as:

$$r_{R^l}^{Y_k} = \frac{\sum_{y_p \in Y_k} \mu_{R^l}(\vec{x}_p)}{\sum_{p=1}^{P} \mu_{R^l}(\vec{x}_p)} \quad (42)$$

Definition 6: Let D be a dataset and $R^l$ a given IF-THEN-rule, respectively, as described previously. Then the rule score, rule weight or dominance of rule $R^l$ towards the linguistic label $Y_k$ is computed using the fuzzy support and fuzzy dominance and is represented by:

$$RW_{R^l}^{Y_k} = [\underline{RW}^{Y_k}, \overline{RW}^{Y_k}] \quad (43)$$

Because the fuzzy support of a rule only depends on the antecedent part, this concept requires no redefinition and remains the same for continuous output systems. Please refer to Definition 1.

It is worthwhile to highlight that the data split $DS^{Y_k}$ in Equation (43) is a fuzzy data split as introduced in Section 3, and different from the data split in Equation (32).

4.4.3 Similarity Metric: What to do when No Rules are Fired

Because the similarity mechanism is based purely in the antecedent part of the rules, and these are shared for both the classifiers and the continuous output systems, this Section is completely analogous to 4.3.4.

The only difference is that, when during the training process no rules are fired, the midpoint of the output range $$\frac{(y_{min} + y_{max})}{2}$$

is provided. During normal operation, as the similarity described in Section 4.3.4 only relies on the antecedent part of the rule, it can be directly extended for continuous output FL models.

4.4.4 Fuzzy Reasoning Method (FRM) for Continuous Output Systems

In this section we will describe the mathematical method to compute the output value y estimated for a given input vector $\vec{x}$. We will assume the centroids of the output linguistic labels $Y_k$, denoted as $C(Y_k)$, have been computed ahead of time, as they do not depend on the inputs. It is worthwhile to highlight and bear in mind that, as we are dealing with an IT2 FLS, all fuzzy membership values will be intervals and, thus, the interval arithmetic described in Section 4.2 will be used.

The procedure to compute the output given a rule-base of L rules will be as follows:

1. Compute the firing strength for each rule l=1, ... L as specified in Equation (33).
2. For those rules that have actually been fired, i.e., whose firing strength is different from [0, 0], compute the following consequent:

$$Consequent(R^l) = C_{R^l} = C(Y_k) * RW_{R^l}^{Y_k} \quad (44)$$

3. Using the firing strength in Equation (33) and the rule consequent in Equation (44) for all fired rules, compute the output type-reduced set/interval $Y(\underline{x}) = [y_l, y_r]$ using the EIASC algorithm [21], [15].
4. Compute the midpoint of the type-reduced interval $Y(\underline{x})$ and provide it as the output of the system.

$$y(\vec{x}) = \frac{y_l + y_r}{2} \quad (45)$$

In the implementation of the fuzzy logic system we are using two different methods to compute the output of the system, each of them serving a different purpose. Both methods and their objectives are addressed in the following:

1. Type-Reduction method (EIASC): The type-reduction algorithm is implemented using the EIASC method [21], [15], and its output is provided as the valid output of the system; this value will be considered the predicted value y for input vector $\vec{x}$.

However, due to the Interval Weighted Average (IWA) problem EIASC solves internally [15], it is not possible to establish how much each of the fired rules contributed to compute the final output value, which is desirable for interpretability purposes.

An important note about EIASC: When both the rule centroids $C(Y_k)$ and the firing strengths $\mu_{R^l}(\vec{x})$ are singletons (using interval notation, [a, a], where a∈ $\Re$), the EIASC algorithm should return another singleton as the output of the system; however, due to round-off errors in the computations, it could happen that the computed intervals are reversed, as in:

$$Y=[y_l,y_r]=[a+\epsilon_l, a-\epsilon_r] \quad (46)$$

Where $\epsilon_l, \epsilon_r$ are tiny amounts. This issue causes computations to throw an exception, as proper representation of intervals in a computer program should not allow to create these reversed intervals. To prevent this from happening, the following mechanism has been established:

(a) A threshold tolerance $\tau$ is set, $\tau=10^{-5}$ by default.
(b) If $|(a-\epsilon_r)-(a+\epsilon_l)|=\epsilon_r+\epsilon_l>\tau$, then the exception is thrown anyway.

Otherwise, the returned interval/singleton is as follows:

$$Y = \left[a + \frac{\epsilon_l - \epsilon_r}{2}, a + \frac{\epsilon_l - \epsilon_r}{2}\right] \quad (47)$$

Intuitively, the result offered by Equation 47 is close enough to the theoretical output a, as $\epsilon_l, \epsilon_r > 0$, $\epsilon_r + \epsilon_l \leq \tau$, therefore $|\epsilon_l - \epsilon_r| \leq \tau$.

2. The D3 method: In order to present the contribution of each rule to the final outcome, a new method based on the Nie-Tan [22][23][15] direct defuzzification procedure has been designed.

It should be borne in mind that within the rule base, the l-th rule (l=1, ..., L) denoted $R^l$, will be characterised by three elements when dealing with a given input vector $\vec{x}_p$, say:

Firing strength:

$$\mu_{R^l}(\vec{x}_p)=[\underline{f}_{R^l}(\vec{x}_p), \overline{f}_{R^l}(\vec{x}_p)]=[\underline{f}_{R^l}, \overline{f}_{R^l}] \quad (48)$$

Output linguistic label:

$$Y^{R^l} \in \{Y_k\}_{k=1}^{K} \rightarrow Y^{R^l}=[\underline{y}_{R^l}, \overline{y}_{R^l}] \quad (49)$$

Dominance:

$$RW_{R^l}^{Y_k} = \left[\underline{RW}_{R^l}^{Y_k}, \overline{RW}_{R^l}^{Y_k}\right] \quad (50)$$

Hence, when trying to compute separately how much each rule is contributing to the output, we will use the Decomposable Direct Defuzzification (D3), based on the Nie-Tan method [22], [23], [15]. If A denotes an interval, then k will denote its midpoint; hence, the D3 approximation for the output would be:

$$\hat{y}(\vec{x}_p) = \frac{\sum_{l=1}^{L} \tilde{\mu}_{R^l}(\vec{x}_p) \cdot \widetilde{RW}_{R^l} \cdot \tilde{Y}^{R^l}}{\sum_{l=1}^{L} \tilde{\mu}_{R^l}(\vec{x}_p) \cdot \widetilde{RW}_{R^l}} \quad (51)$$

Grouping appropriately:

$$\hat{y}(\vec{x}_p) = \sum_{l=1}^{L} \left[\frac{\tilde{\mu}_{R^l}(\vec{x}_p) \cdot \widetilde{RW}_{R^l}}{\sum_{l=1}^{L} \tilde{\mu}_{R^l}(\vec{x}_p) \cdot \widetilde{RW}_{R^l}}\right] \cdot \tilde{Y}^{R^l} = \sum_{l=1}^{L} D_{R^l} \cdot \tilde{Y}^{R^l} \quad (52)$$

Each of those terms $D_{R^l}$ are related to the midpoint of the rule consequent centroid, and thus can be considered a measure of how much each rule is contributing to the approximated output.

4.5 Sampling Technique: How to Create a Synthetic Locally Meaningful Population

The sampling method aims to generate random synthetic points (denoted as $\vec{z}$) around the instance we want to explain (denoted as $\vec{x}$ or $\vec{x}_e$). The word around is a bit tricky: we want to generate those points $\vec{z}$ close enough to z in order to maintain locality and capture the local meaning; but also we would like to have those points spread enough so as the resulting synthetic population is robust and diverse enough for the rest of the algorithm.

Both points will have a total of I features, and $x_{e,i}$ and $z_i$ will denote the i-th component of each vector, respectively. Thus, the procedure to generate a sample point is described in the following steps:

1. Start by setting $\vec{z} = \vec{x}_e$.
2. Randomly choose an integer number N such that N∈ [1, I]. This will be the number of features to be changed from the originally copied $\vec{z}$.

Figure 5:
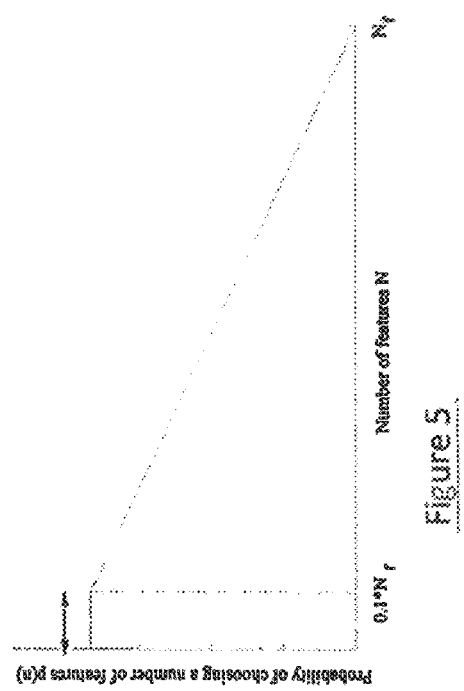
FIG. 5 shows an example distribution to choose how many features to change.

The number N will be randomly generated using the distribution specified in FIG. 5. This distribution combines a flat region, then a linear decreasing slope until reaching 0. The size of the flat region can be controlled with a parameter, where 0 indicates the flat region is non-existent, and 1 means the flat region covers all the domain (i.e. the distribution would be uniform). This parameter is set to 0.1 by default.

3. Let FIS (Features Index Space) be FIS={n∈ $\mathbb{N}$ |n∈ [1, I])}, i.e., the set of all indices for all features. Let also $F_s$ be a subset of FIS, i.e.

$F_s \subseteq$ FIS, representing the indices of the features to be changed:

$$F_s \subseteq FIS | \#F_s = N \quad (53)$$

Hence, $F_s$ is selected as a random subset of FIS, where every element in the latter is equally probable to be chosen, without replacement.

4. For every index/feature in $F_s$, shuffle it randomly according to the original distribution. For each feature type, this works as follows:
   (a) If feature k is categorical with 3 distinct values, say $k_1$, $k_2$, $k_3$, with a split of $k_1$=60%, $k_2$=25% and $k_3$=15%, then the k component in the sampled point $\vec{z}$, $z_k$, would be generated with the following distribution:

$$z_k = K \leftrightarrow P(K=k_1)=0.6, P(K=k_2)=0.25, P(K=k_3)=0.15 \quad (54)$$

(b) If feature k is continuous, then the original distribution is grouped in 10 bins; then, a given bin is chosen according to the binned distribution, and the midpoint of such a bin is assigned.
   (c) If feature k is mixed, then the numerical part is binned in 10 bins; in addition, categories are treated as independent bins. The final sample is generated from the resulting distribution.

5. Repeat steps 1-4 until generating the number of samples desired, $N_s$.

NOTE: it is worthwhile to highlight that the procedure described above does not guarantee that, when a feature is selected, it will be changed; and besides, it is possible to generate the exact same sample more than once, as well as generating the exact same instance we are trying to explain, $\vec{x}_e$. Hence, enough samples should be generated in order to guarantee at least $N_s$ distinct points different from $\vec{x}_e$.

4.6 the Distance Metric and Weights Based on Kernel Functions

In order for a local model built around an instance to be locally faithful, enough data of that region must be available through synthetic sampling. In this context, there will be a trade-off: the closer the a synthetic sample is to the explanation (in the sense of some distance function), the more similar they will be and therefore more information could be extracted; nonetheless, if all points generated in the synthetic population are very close, the resulting local dataset might end up lacking any diversity or variety, so local models will find no distinct patterns.

In order to solve this, the local model XAI module will generate a synthetic population following these principles:
1. Points can be generated across all input space. However, it will be much more likely to generate points closer to the explained instance.
2. According to some parameterised distribution, the more separate a synthetic point is from the explained point, the more unlikely it is to be generated.
3. A distance metric will be used to generate weights for every point in the synthetic population, which will account for the contribution of each vector to the local model building process.

If we let $\vec{x}_e$ be the instance to explain and $\vec{z}_p$ a synthetic point, then in general the weight associated to $\vec{z}_p$ will be:

$$\alpha_z(\vec{z}_p) = \omega_p = \exp\left(\frac{-D(\vec{x}_e, \vec{z}_p)^2}{\sigma^2}\right) \quad (55)$$

Where $\sigma$ is some measure of spread around $\vec{x}_e$.

Four different distances have been proposed so far, although many more can be defined and used. It is worthwhile to highlight that each component of the feature space (i.e. either $x_{e,j}$ and $z_{p,j}$, j=1, ..., I) can be one of the different types of variables as described in Section 4.1. Such distances are presented in the following:
1. Original: this metric implies:
   (a) Continuous features: transformation is as follows:

$$\tilde{x}_j = \frac{x_j - x_{min}}{x_{max} - x_{min}} \in [0, 1] \rightarrow D(x_{e,j}, z_{p,j}) = |\tilde{x}_{e,j} - \tilde{z}_{p,j}| \quad (56)$$

(b) Categorical features:

$$D(x_{e,j}, z_{p,j}) = \begin{cases} 0 & \text{if } x_{e,j} = z_{p,j} \\ 1 & \text{otherwise} \end{cases} \quad (57)$$

(c) Mixed features:
      i. If both are numeric→as continuous.
      ii. If both are categories→as categorical.
      iii. If they are different→D $(x_{e,j}, z_{p,j})$=1
2. Normalised 1σ: same as the original, but replacing the normalisation of continuous variables. In this case, each numerical value, whether it belongs to $\vec{x}_e$ or $\vec{z}_p$ (also mixed when not categorical) will be normalised by the standard deviation $\sigma_j$:

$$\tilde{x}_j = \frac{x_j}{\sigma_j} \quad (58)$$

Intuitively, if the data follows a normal distribution this transformation would map 96% of the data in the (−3, 3) interval.
3. Normalised 2σ: normalisation by 2σ. Intuitively, if the data follows a normal distribution this transformation would map 96% of the data in the (−1.5, 1.5) interval.
4. Normalised 3σ: normalisation by 3σ. Intuitively, if the data follows a normal distribution this transformation would map 96% of the data in the (−1, 1) interval.

Once each component for both $x_e$ and $z$ have been normalised according to their nature (continuous, categorical or mixed) the final distance is computed as follows:

$$D(\vec{x}_e, \vec{z}_p) = \sqrt{\frac{\sum_{j=1}^{I} D(x_{e,j}, z_{p,j})^2}{I}} \quad (59)$$

Because in all previous distances each feature i=1, ..., I has been normalised and/or processed independently, the weight generator function used will be a specific version of Equation (55) with σ=1:

$$\omega_p = \exp(-D(\vec{x}_e, \vec{z}_p)) \quad (60)$$

Figure 6:
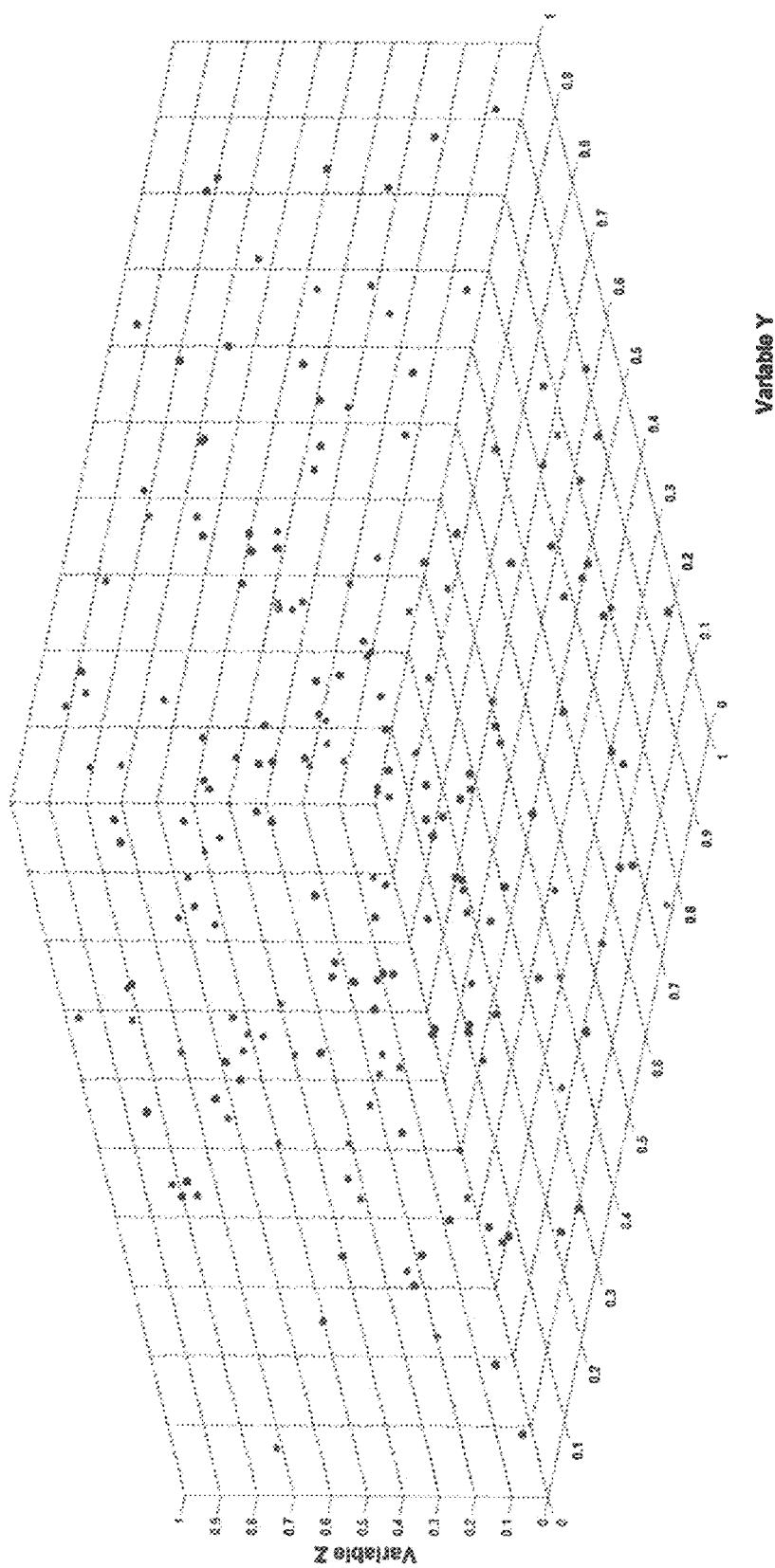
FIG. 6 is a 3D diagram for a classification problem involving three inputs (X, Y and Z) and one binary output.

FIG. 6 is a 3D diagram for a classification problem involving three inputs (X, Y and Z) and one binary output, where the "Good" predictions are shown as the dark grey circles and the "Bad" predictions are shown as black circles.

5. High Level Description of the Local Models XAI Module

Figure 7:
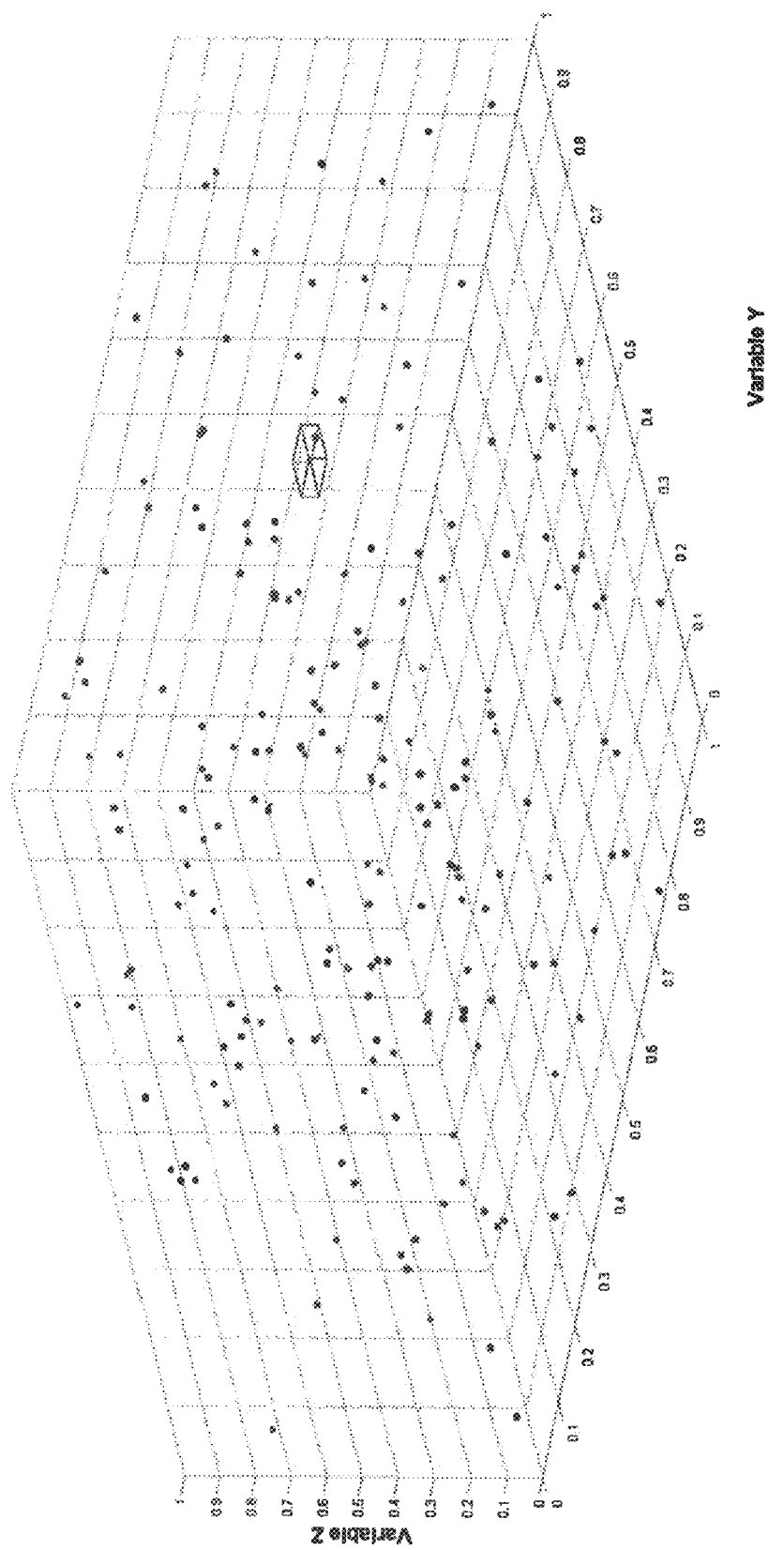
FIG. 7 shows a given instance $\vec{x}e$ highlighted by a cube—such a delimited region represents the "vicinity" for which the local model will be built to offer insights and this illustrates justifying the prediction of the instance highlighted by the square.
Figure 8:
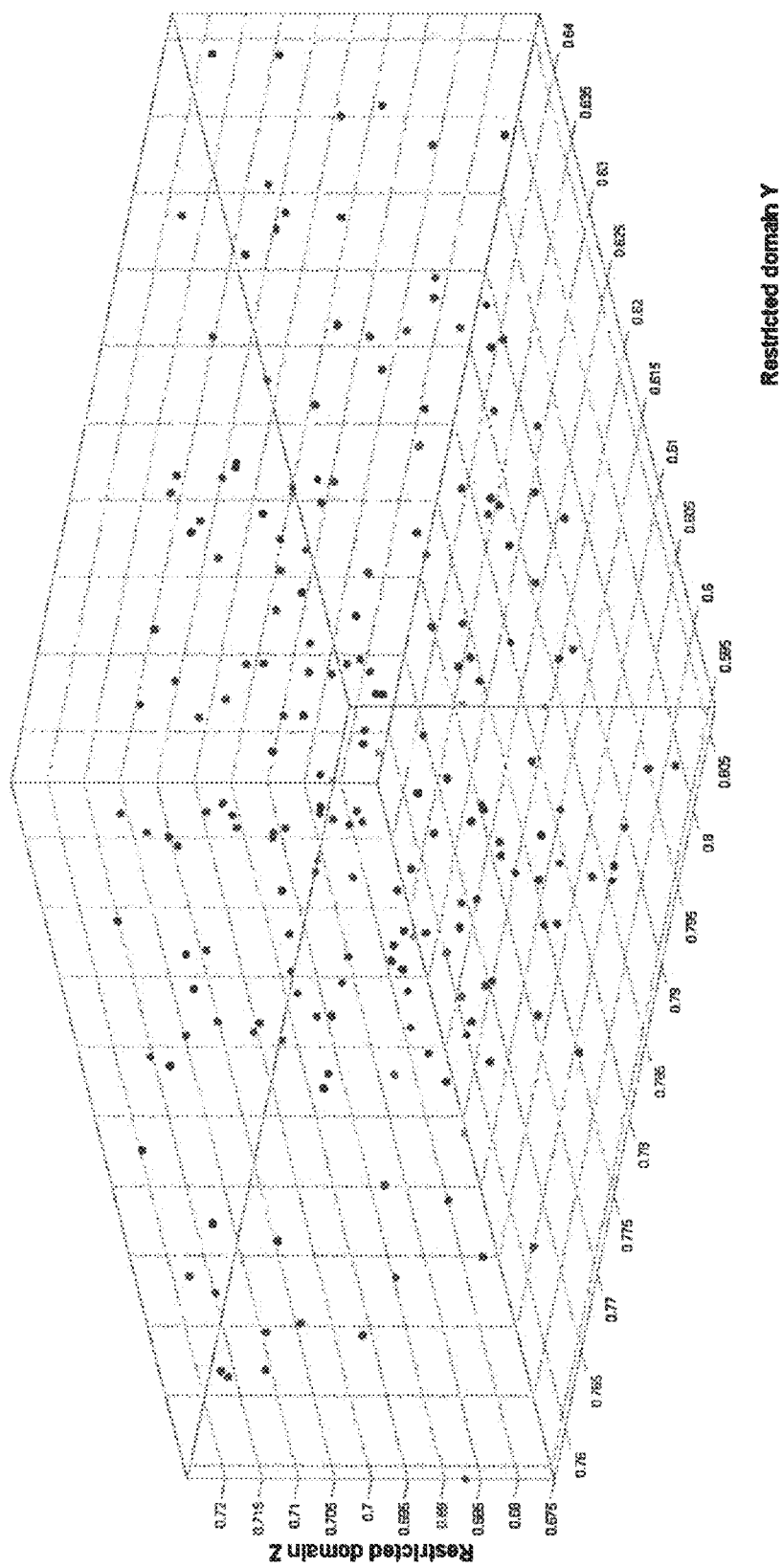
FIG. 8 represents the local vicinity of FIG. 7 zoomed in, where the synthetic sampling process will happen.

In order to understand the proposed system, a visual representation is provided via FIGS. 6-8:
1. FIG. 6 represents an example of a binary classification problem involving three inputs (X, Y and Z) and one binary output (Good (dark grey)/Bad (black)) representing the prediction of a complex/opaque model thus visualizing the problem as a 3D diagram.
2. FIG. 7 shows a given instance $\vec{x}_e$ highlighted by a cube: such a delimited region represents the "vicinity" for which the local model will be built to offer insights.
3. FIG. 8 represents such local vicinity zoomed in, where the synthetic sampling process will happen. Sampled points around x' to create sample points z' and the model prediction f (z') are shown, respectively, in dark grey and black.

The system progresses by sampling the local area around the given instance $\vec{x}_e$, creating new synthetic points $\vec{z}_p$ by drawing non-zero elements from the input feature space at random. In addition, each artificial $\vec{z}_p$ will be assigned a weight given by $a_z(\vec{z}_p)$, allowing the points closer to $\vec{x}_e$ to have greater importance than the ones generated at a farther distance. It is worth noting that the method is fairly robust to sampling noise since the samples are weighted by.

All $\vec{z}_p$ will be run through the opaque model, creating a synthetic dataset population to build a local model around $\vec{x}_e$.

Figure 9:
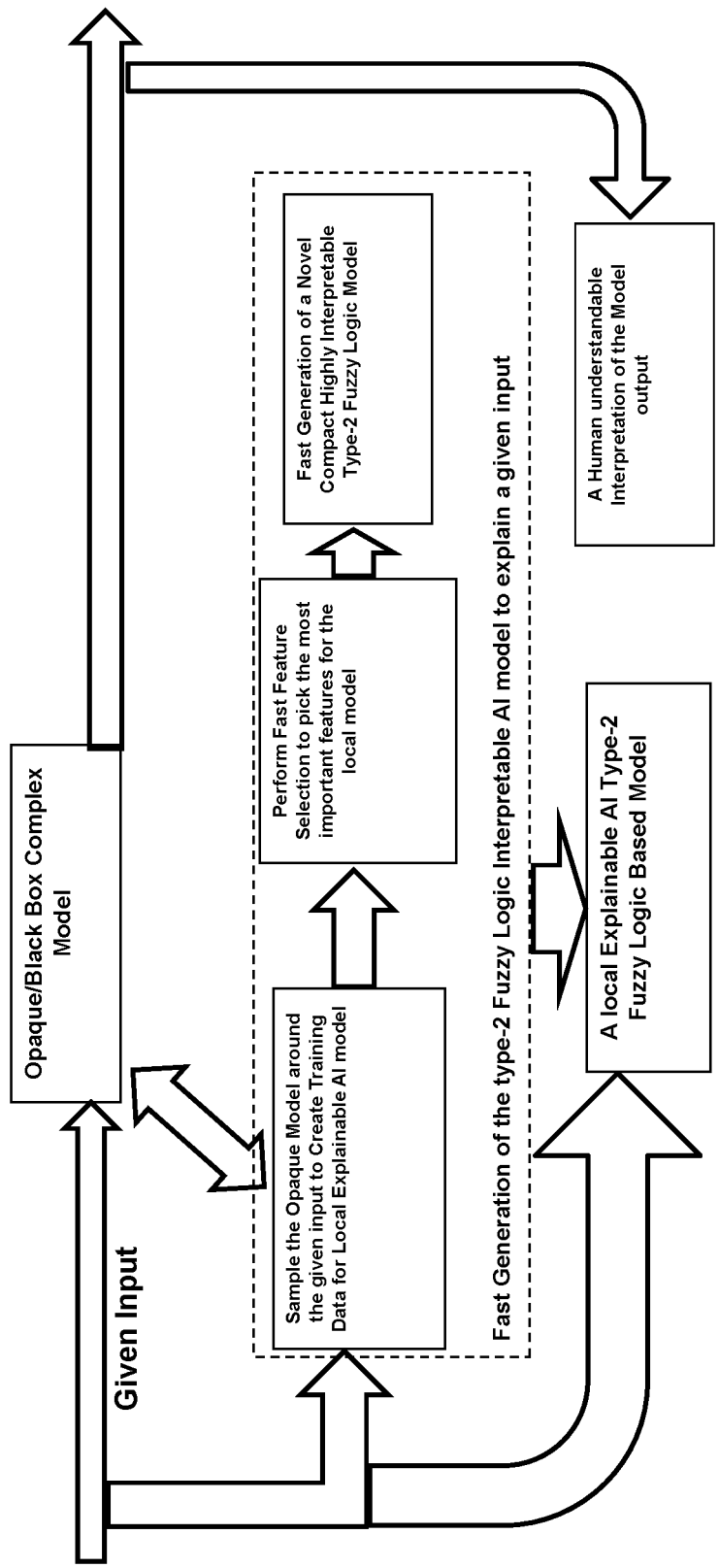
FIG. 9 shows an overview of the Explainable AI local component which employs type-2 fuzzy logic to generate human understandable models and explanations which can explain the opaque AI model and decision in a given input/output local vicinity.

The high-level description of the workflow is captured in FIG. 9 on the Explainable AI local component which employs type-2 fuzzy logic to generate human understandable models and explanations which can explain the opaque AI model and decision in a given input/output local vicinity. There are two phases for a given input activating the opaque AI model where it is needed to understand/explain and justify the model output at the local vicinity of the given input/output, the two phases are as follows:

Phase 1: Fast generation of Type-2 Fuzzy Logic Model in the local vicinity of the given input/output which includes the following steps:

Sample the Opaque model around a given input to create training data to train the type-2 fuzzy logic model.

Perform a fast feature selection to find the most important and small number of features to build the type-2 fuzzy logic model.

Fast Generation of a Novel Compact Highly Interpretable Type-2 Fuzzy Logic Model.

Phase 2: Firing the generated type-2 fuzzy logic model with the given input to gain human understandable interpretation of the output from the opaque model. This also allows analysis of the opaque model in the local vicinity of the input (for example explaining how a given customer can switch from being a Good to a Bad customer to understand the edge cases and any risks).

6. The Explainable Artificial Intelligence Local Models

Figure 10:
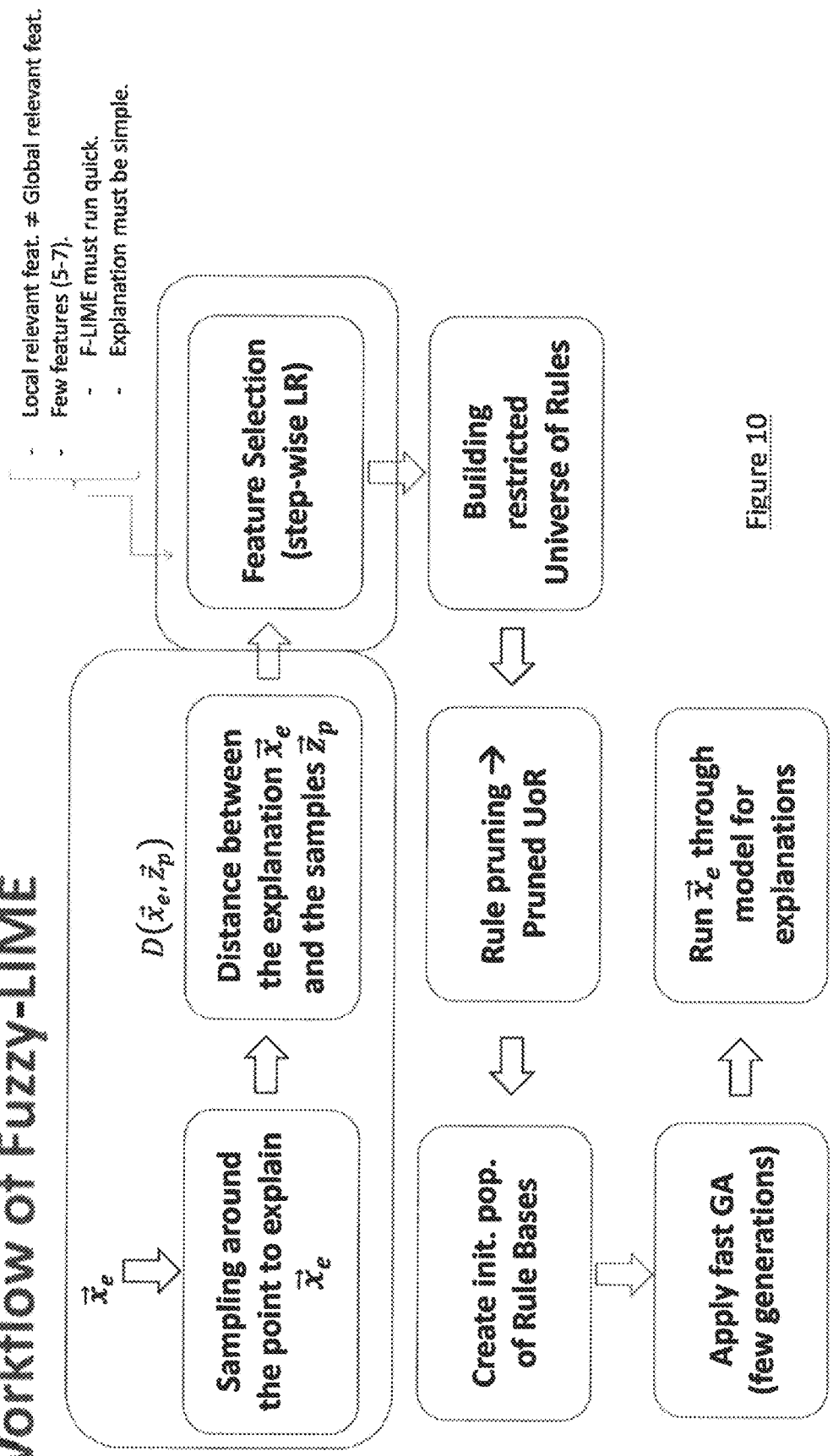
FIG. 10 shows a detailed representation of the Explainable AI local component's workflow corresponding to FIG. 9.
Figure 11:
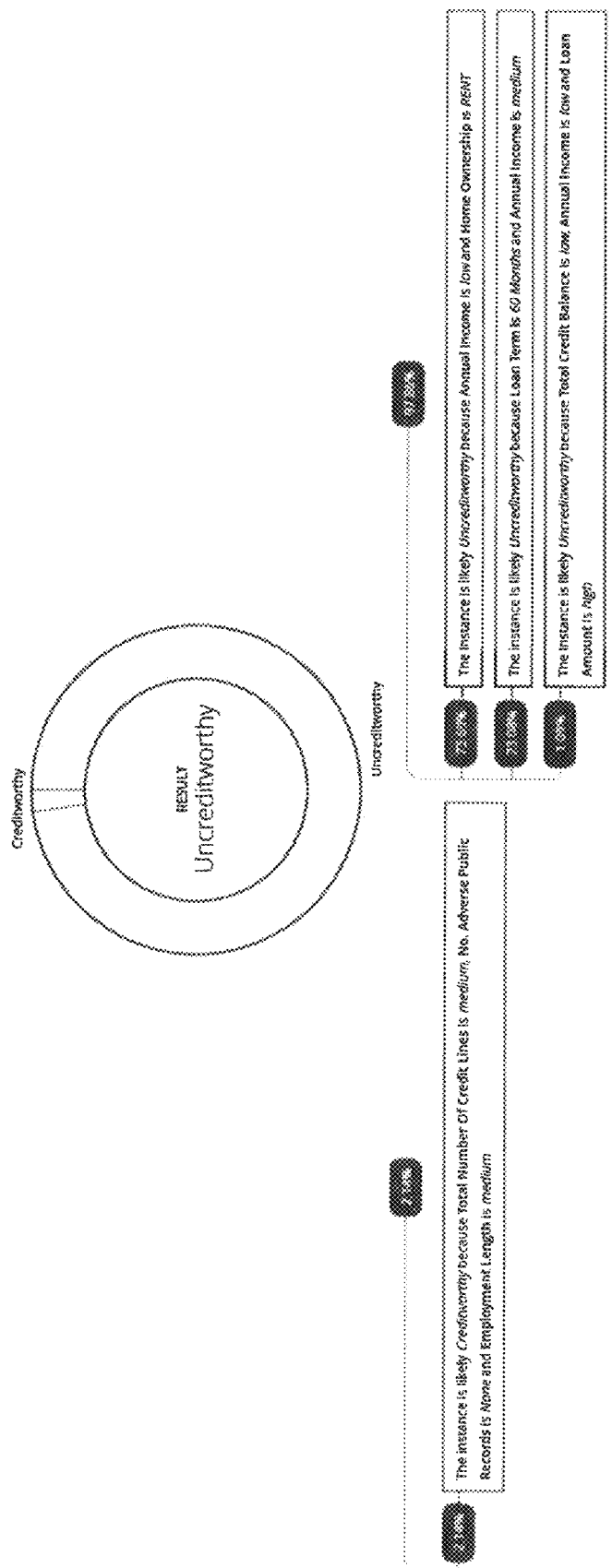
FIG. 11 shows a decision presented by the local AI model in a comprehensive format.

Coming into deeper detail, FIG. 10 shows a detailed representation of the Explainable AI local component's workflow, which employs type-2 fuzzy logic to generate human understandable models and explanations which have the potential to explain an opaque AI model and decision (that is, a detailed workflow of the XAI local model system). This workflow is comprised of several steps, which will be itemized in the following:

1. Choose a given instance to be locally explained, $\vec{x}_e$.
2. Sample the input feature space around the chosen instance as described in Section 4.5, so as to create synthetic training data comprised by a set of P samples, denoted $\vec{z}_p$, p=1, ..., P. Make sure $\vec{x}_e$ is not contained in the synthetic data.
3. Run the synthetic population through the original opaque model, in order to obtain both the score and/or the classification output, i.e., each $f(\vec{z}_p)$.
4. Compute the distance between $\vec{x}_e$ and each $\vec{z}_p$ given by D ($\vec{x}_e$, $\vec{z}_p$) and, with it, the associated weights $\omega_p$ to each $\vec{z}_p$ using Equation (55).
5. Perform a fast feature selection to find a small subset of the most important drivers using the synthetic population, their score/label $f(\vec{z})$ and the weights $\omega_p$ associated to each sample. Two different approaches can be performing a Linear regression if $f(\vec{z})$ is a score, or a Logistic Regression if $f(\vec{z})$ is a class/label. In both cases the objective function should include each $\omega_p$.
6. Repeat the sampling process but only using the features selected in the previous step, to obtain a second local synthetic population. Compute their distances and weights as well, and run this second synthetic population through the opaque model, as done with the first synthetic population.
7. Use the second local synthetic population to build a FL model. Because the synthetic data is usually fairly small and the number of features involved is quite low, the FL model should be built using configuration parameters that allow a very fast generation.
8. Run the instance to explain through the generated type-2 fuzzy logic model (FIG. 11). Due to the nature of this classifier, the output will be interpretable by a human. And because the synthetic population is sampled around a specific instance, the created system will capture the local behaviour of the opaque model in such vicinity.

Figure 12:
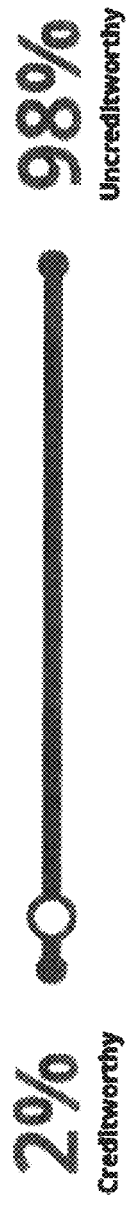
FIG. 12 shows the decision presented in compact view format.

This approach allows analysis in the local vicinity of the input instance to be explained, and permits gaining insights about what are the differences between the classes in the same region of the input feature space; for instance, in the context of the lending business, this approach would allow an explanation as to how a given customer can switch from being a "Creditworthy" to an "Uncreditworthy" customer, to understand the edge cases and any risks. When a user wants to query, the user simply clicks on the given decision and the system queries the generated local model and presents the user with the reasoning behind the given decision in a linguistic format which has pros and cons where the contributing rules are weighted according to their importance in the given decision. The decision can be presented in a comprehensive format as shown in FIG. 11 or compact view format as shown in FIG. 12. Such formats allow the user to easily understand the drivers and their combination using linguistic labels such as Low, Medium and High, where such drivers are combined using IF-Then rules and the given decision has Pros and Cons. This is the natural process any decision maker takes where each decision has Pros and Cons which are weighted, and the decision maker weighs such decision in his mind and takes a decision where the Pros outweigh the Cons or vice versa.

The FL model building stage is fairly complex, and is explained separately in the next subsection.

6.1 Fuzzy Logic Local Model Building Stage

In this section and its subsections, the model building procedure is described step by step. This process includes:

Generating a Universe of Rules.
Pruning the Universe of Rules.
Using a random search approach to select a subset of rules to conform the final system.

6.1.1 Building a Universe of Rules

In this subsection we will describe the procedure to generate all candidate rules that could potentially be part of the final system. This method is based on the ideas and techniques presented in [24].

Let $n_{max}$ be the maximum number of premises allowed in a rule antecedent. Hence:

Definition 7: An itemset will be a given combination of $n \in \mathbb{N}$ premises related to different features, $n \in [1, n_{max}]$.

Therefore, an itemset can form the antecedent part of a fuzzy rule.

In order to generate the Universe of Rules, we use a search tree to create all possible rules having between 1 and $n_{max}$ linguistic labels/premises from different features to conform the antecedent part of the rules. We will assume the features are ordered and labelled.

The root node of the search tree will be the empty set (thus is not a rule antecedent). All item sets of length 1 will be listed in the first level of the tree, in ascending order of the features, representing rules with one single premise in the antecedent part. It is, the tree will have in the first level firstly the $n_1$ different labels for feature $x_1$, secondly the $n_2$ labels for $x_2$, and so on, until the $n_I$ labels belonging to feature $x_I$.

The children of these one-item nodes are two-item nodes, representing rules with two premises in the antecedent part: the first one is the premise from the parent node, say $X_i^j$, and the second one is a label from a feature listed behind $x_i$, say $x_k$, with k>i.

This procedure can be generalised for level n: children nodes from level n will contain the n−1 linguistic labels/premises from its parent node, plus another label belonging to a feature that is not contained in the rule as is listed behind the feature with greatest index. The process will go on iteratively until we reach the level $n_{max}$, i.e., until we have generated the level of the tree in which rules have $n_{max}$ premises/linguistic labels in the antecedent part.

Figure 13:
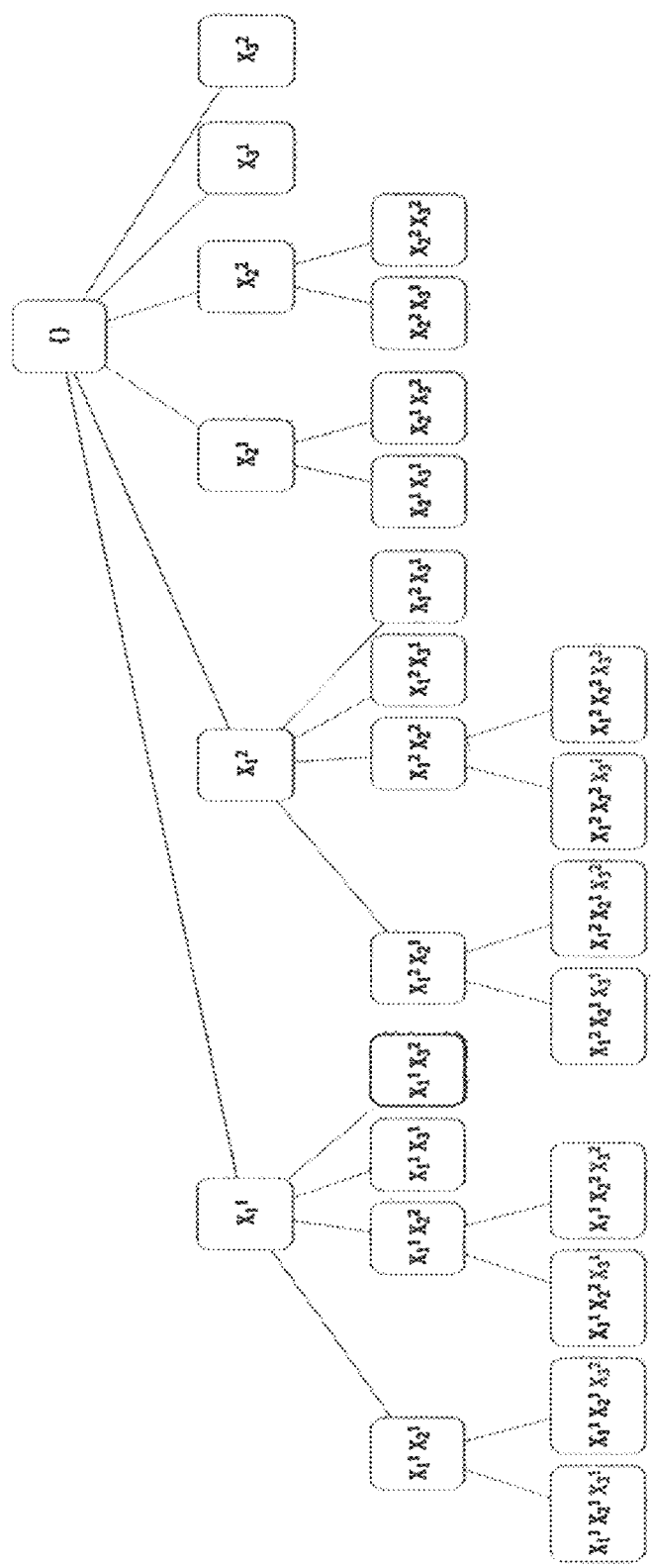
FIG. 13 shows the Universe of Rules for $n_{max}=3$.

An example of all possible antecedents generated using this tree approach is depicted in FIG. 13, where 3 features were used ($x_1$, $x_2$ and $x_3$), each of them having 2 different linguistic labels. Accordingly, FIG. 13 shows the Universe of Rules for $n_{max}=3$.

To finally conform the Universe of Rules, each of the antecedent part represented in the tree will be attached each possible output class/linguistic label, $C_k/Y_k$ in the consequent, so each of the nodes in the tree will create K different rules, where K is the number of classes/linguistic labels defined over the output domain.

6.1.2 Pruning the Universe: Restricted Universe of Rules

In Section 6.1.1 the creation of all possible rules was described, and how to score them was introduced in Section 4.3.2, Equation (32). However, not all rules generated will be useful for the system. To reduce the number of usable rules from the whole Universe, a two steps approach will be applied: in the first step a set of basic filters will be used; the remaining rules will then pass a complexity filter. The rules passing both criteria will conform the Pruned Universe of Rules, i.e., all rules that are potentially valid to be part of the final system.

Basic Filters The first set of basic filters the rules will be tested on are listed in the following.

A given rule $R^l$ will be discarded
  If its support $S_{R^l}$ is smaller than a predefined threshold, i.e., $S_{R^l} < S_{min}$. This means the pattern represented by the rule is too infrequent to have any predictive power.
  If its support SRI is greater than a predefined threshold, i.e., $S_{R^l} > S_{max}$. This means the pattern represented by the rule is too common and its existence does not offer any predictive power.
  If it contains a linguistic label for a given feature of the type $x_i$ is [blank], or any other label/premise representing the absence of data/information.
  If its score/dominance is negative. Considering Equation (32) defining the score for a given rule, due to the interval arithmetic involved and described in Section 4.2, it is possible to obtain a rule score verifying $$\underline{RW}_{R^l}^{C_k} < 0 \text{ and } \overline{RW}_{R^l}^{C_k} > 0.$$

Hence, a rule will be discarded if its score/dominance is partially negative, it is, if at least $$\underline{RW}_{R^l}^{C_k} < 0.$$

If there is another rule with the same antecedent part and different output label with higher score. It is, if the number of labels K>2, it is possible for the same antecedent part to have a positive dominance for more than one output label. In such a case, the rule that will remain is the one with higher score, discarding the others.

Complexity Filter

The complexity filter's intention is to try and keep the system as simple as possible, only allowing extra complexity when it adds predictive value towards the output. Firstly, consider where there are two rules, one with two premises in the antecedent and the other one with three, such as:

$$\text{IF } x_{i_1} \text{ is } X_{i_1}^{j_1} \text{ AND } x_{i_2} \text{ is } X_{i_2}^{j_2} \text{ THEN } y \text{ is } C_k \quad (61)$$

$$\text{IF } x_{i_1} \text{ is } X_{i_1}^{j_1} \text{ AND } x_{i_2} \text{ is } X_{i_2}^{j_2} \text{ AND } x_{i_3} \text{ is } X_{i_3}^{j_3} \text{ THEN } y \text{ is } C_k \quad (62)$$

For simplicity, the first rule is denote d as AB and the second one as ABC, where each letter represents a premise from a given feature. It is clear that Equation (62) represents a subset of Equation (61). Hence, in order for a more complex rule to remain in the Universe it must satisfy all the following conditions:

For a rule $R^l$ with n premises in the antecedent, we can generate n more general rules, each of them being exactly the same as $R^l$ but removing one premise; i.e., from the rule ABC we can generate AB, AC and BC. Therefore, at least n−1 of these rules must still remain in the Universe for $R^l$ to be retained, i.e., the simpler rules must have passed both the simple and complexity filters previously.

The rule being tested must point to the same linguistic label as the simpler versions.

If the previous conditions are met, then we must check the fuzzy confidence of $R^l$, which must be greater that the confidence of all simpler rules remaining in the Universe.

If a rule meets all three conditions when compared to the simpler versions, it is kept in the Universe of Rules; if it fails one condition, it is discarded. This procedure is applied iteratively, firstly on rules with 2 premises, then on rules with 3, and so on until applying the complexity filter to rules having $n_{max}$ premises in the antecedent.

The resulting set of rules that were not discarded in either the simple or the complexity filters will be referred to as the Pruned Universe of Rules.

6.1.3 Selecting a Rule Base as the Final System

In order to select a subset of rules (or rule base) as the final FL system, a pseudo- random search algorithm can be used, such as Genetic Algorithms (GAs), Particle Swarm Optimization (PSO), among many others.

Taking the Pruned Universe of Rules as the starting point, the process of selecting a rule base consists of finding a finite and relatively small subset of L rules, $L \leq L_{max}$, that offers the best performance for a given dataset D, in the sense of some fitness function, which can be maximising average recall for classifiers, and minimising mean square error for continuous output systems.

Figure 14:
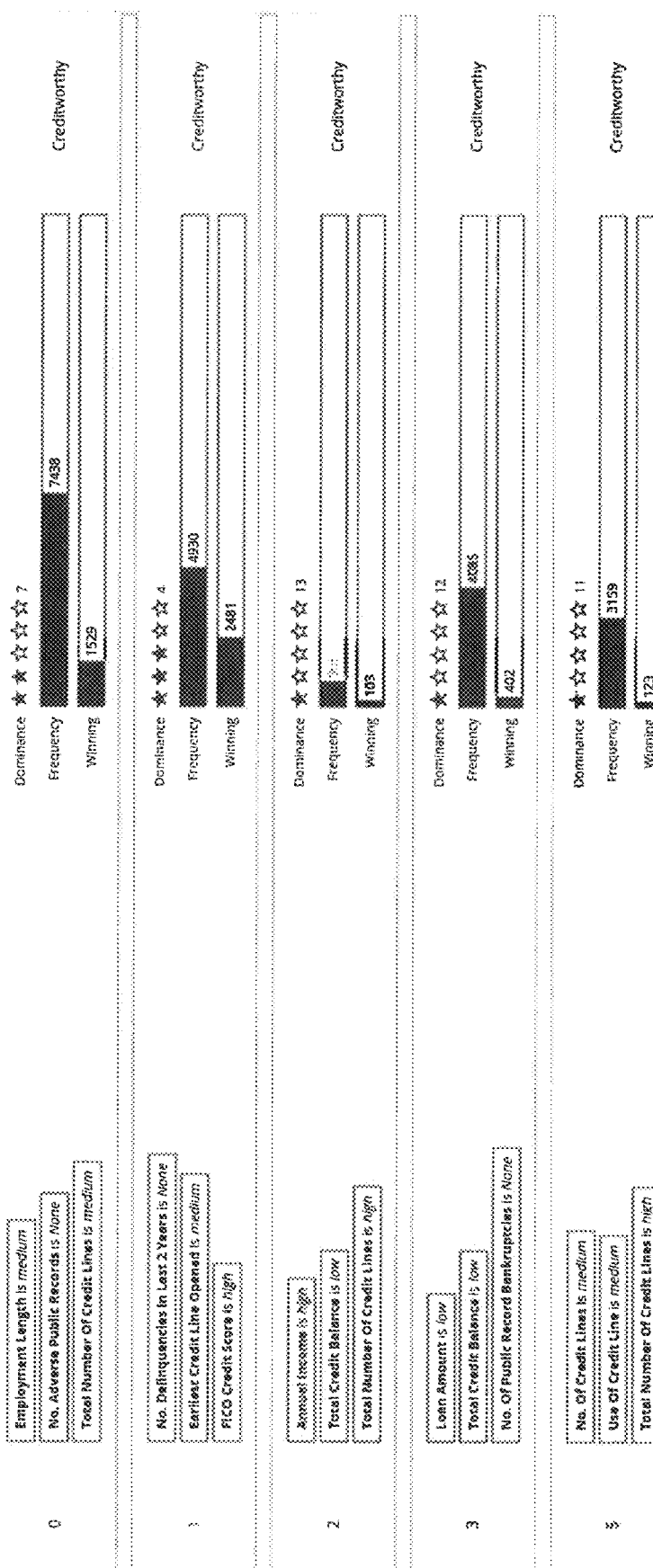
FIG. 14 shows an example for rules obtained for the good class in a local model.

After the pseudo-random search algorithm is terminated, the best system found will be chosen and provided as the final classifier/system. FIG. 14 shows an example for rules obtained for the good class in a local model.

7. High Level Description of the Global Surrogate Model

Figure 15:
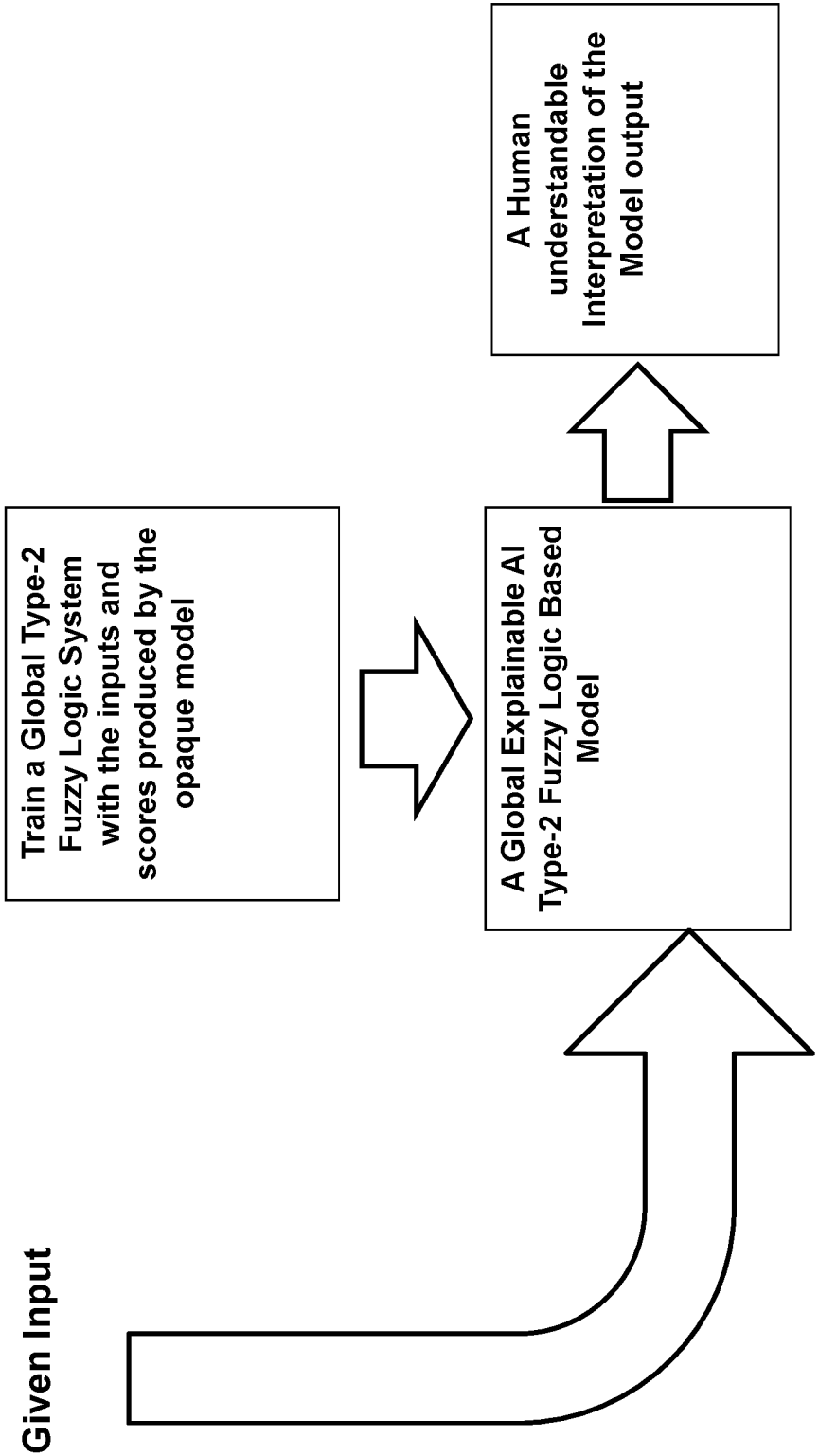
FIG. 15 shows an overview on the Explainable AI global component according to the present invention: a surrogate system to globally approximate an opaque model.

The main idea is to build a surrogate FL system that would fit and approximate the continuous value provided by the opaque model (whether it is a score or number). The overall approach is presented in FIG. 15.

Intuitively, if an FL system is found that can properly explain the numerical output of an opaque model using a base of fuzzy IF-THEN rules, then the nature of such rule based comprising that surrogate model would potentially allow linguistic explanations to be offered regarding which are the main drivers participating in the opaque model output.

So, in essence, a surrogate system to globally approximate an opaque model is a FL continuous output model fitting the score/numerical output of such opaque system.

8. The Explainable Artificial Intelligence Global Surrogate Models

In this section and its subsections the model building procedure for surrogate FLSs is described step by step. This process is completely analogous to the one described in Section 6.1, but changing the rule metrics and related quantities to the ones referring to continuous output scenarios.

8.1 Original Model Population with Scores

The starting point for building a surrogate transparent model that can potentially offer insights about the behaviour of an opaque model with continuous numerical output is a dataset D, comprised by P input/output pairs in the form $(\vec{x}_p, \hat{y}_p)$. It is worthwhile to highlight that, in this case, $\hat{y}_p$ refers to the output provided by the opaque model, and not the original output value of instance $\vec{x}_p$, i.e., it does not refer to $y_p$. This value provided by the model can be a naturally continuous output (as in a regression problem) or a continuous score (as, for instance, in Logistic Regression classification models).

8.2 Linguistic Labels for the Output

Unlike the FL classifier, in this case each input sample $\vec{x}_p$ has a numerical output associated, $y_p$, which belongs to a given range, i.e., $y_p \in [y_{min}, y_{max}] = Y$. In this case, the whole output range Y will be initially divided in K different fuzzy sets/linguistic labels, as if it were a continuous feature and as described previously in Section 4.1.1.

Nonetheless, on top of that, two extra fuzzy sets/linguistic labels might be required to be defined in the output domain, so as to be able to cover the whole $[y_{min}, y_{max}]$ range.

8.3 Continuous Features as the System Output: "Extreme" Linguistic Labels

As was described before in Section 4.4.4, to compute the output of the system $\hat{y}_p$ for a given input $\vec{x}_p$, it is necessary to compute the centroid of the output linguistic labels $Y_k$ ahead of time, in order to be able to use the centre-of-sets type-reduction method. However, this approach can present a limitation, as explained in this Section.

Figure 16:
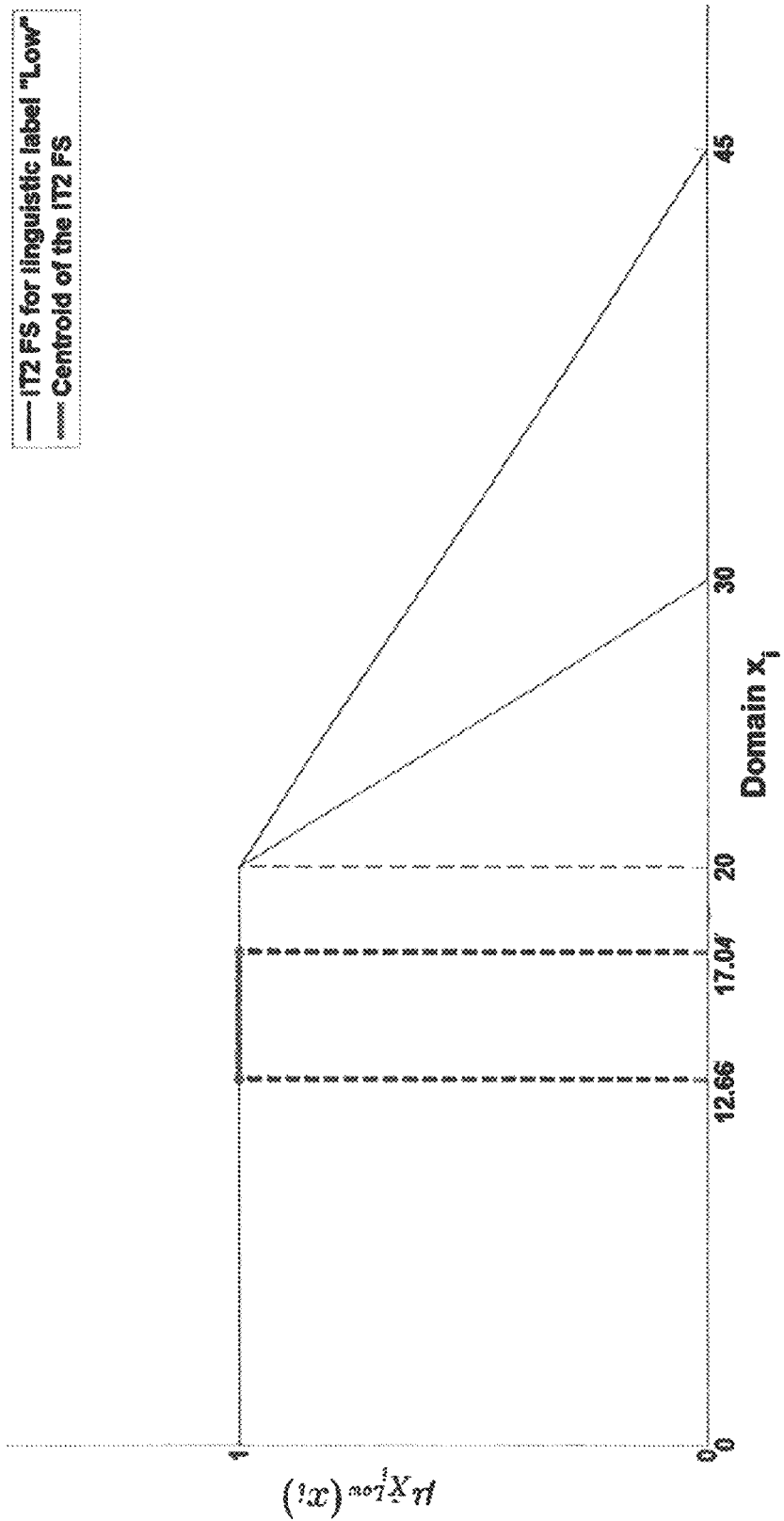
FIG. 16 shows an example of a "Low" MF and its centroid.

FIG. 16 depicts a typical Low IT2 membership function as well as its computed centroid for a continuous feature; such centroid will represent the whole linguistic label during the system operation, as detailed in Section 4.4.4. Because the centroid calculation for IT2 FSs is some kind of averaging operation, this implies the system will not be able to compute any output values lying below the left extreme of the centroid (12.6641 in the example). An analogous situation is present in the upper extreme of the output domain, with the right-most linguistic label. Hence, the output range $[y_{min}, y_{max}]$ cannot be completely covered.

In order to solve this issue, two extra linguistic labels, namely Extremely low and Extremely high will be introduced. An example for obtaining Extremely low will be presented; obtaining the Extremely high will be completely analogous.

1. Compute the midpoint of the core of the Low MF, where the core is the region of the domain for which $\mu_{X_i}(x_i)=[1, 1]$. In the example depicted in FIG. 1, such a midpoint can be expressed as:

$$\text{Midpoint} = x_{i,min} + \Delta x_i = x_{i,min} + \frac{h_{1/6} - x_{i,min}}{2} \quad (63)$$

2. Redefine the Low MF as follows:

$$\overline{\mu}_{X_i^1} = \begin{cases} 1 & x_{i,min} + \Delta x_i \leq x_i \leq h_{1/6} \\ \frac{h_{2/6} - x}{h_{2/6} - h_{1/6}} & h_{1/6} \leq x_i \leq h_{2/6} \\ 0 & \text{otherwise} \end{cases} \quad (64)$$

3. Define the Extremely low $\mu_{X_i^{Ext.low}}(x_i) = \mu_{X_i^0}(x_1)$ as follows:

$$\mu_{X_i^0}(x_i) = \begin{cases} [1, 1] & \text{if} \quad x_{i,min} - \Delta x \leq x_i < x_{i,min} + \Delta x \\ [0, 0] & \text{otherwise} \end{cases} \quad (66)$$

4. As the MF for the Low label has been changed, its centroid needs to be recomputed and updated.

Figure 17:
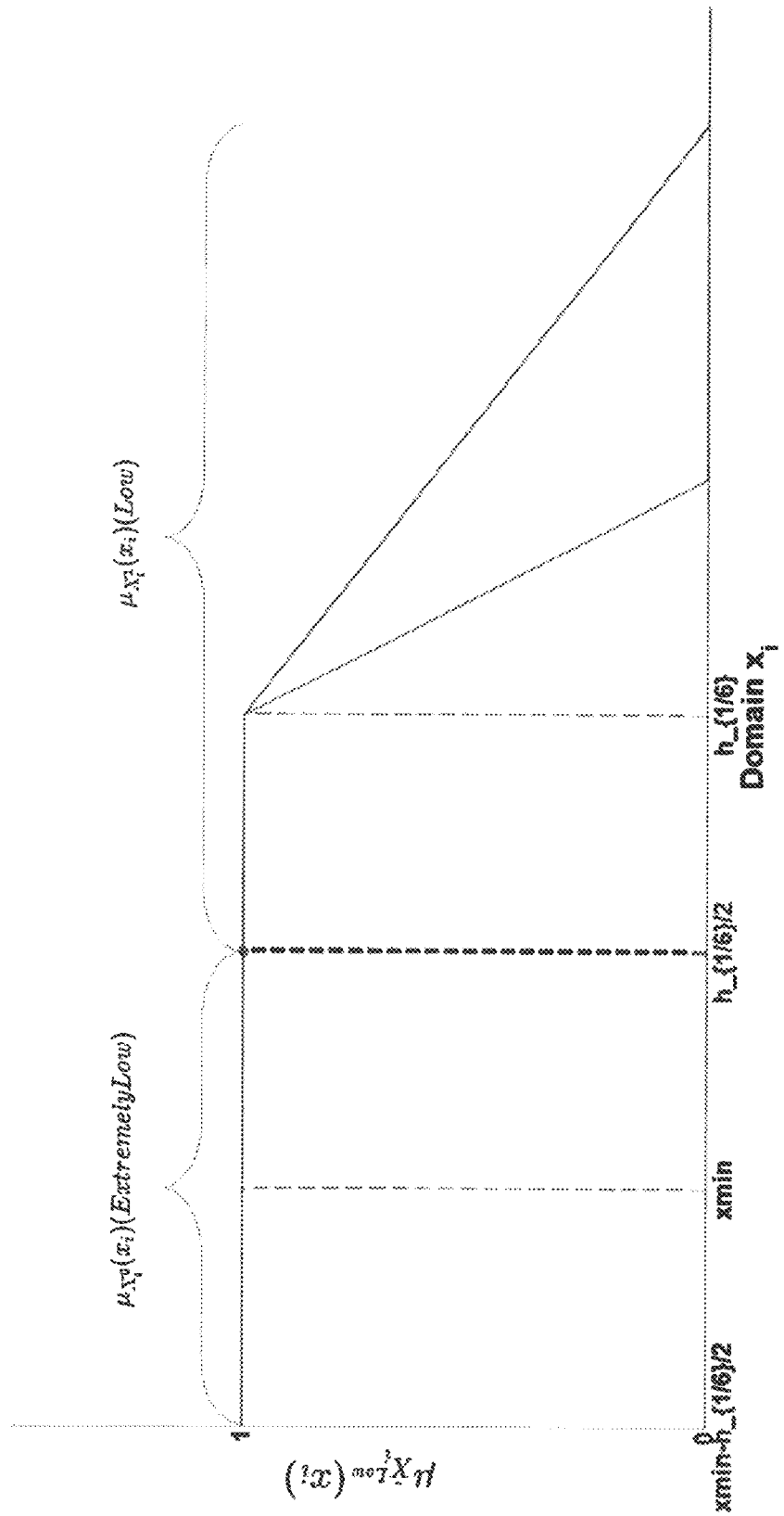
FIG. 17 illustrates "Extremely low" and "Low" linguistic labels.

This procedure is depicted in FIG. 17. It is worthwhile to highlight that $\mu_{X_i^0}(x_i)$ is partially defined over a region of the input domain that does not exist, it is, over [xi, min−Δx, xi, min). This is a mathematical trick to ensure its centroid is exactly xi, min, i.e.:

$$\text{Centroid}(\mu_{X_i^0}(x_i)) = C(\mu_{X_i^0}(x_i)) = [x_{i,min}, x_{i,max}] \quad (67)$$

With this procedure, the artificial linguistic label Extremely low will point exactly to the lowest value of the output domain. A completely analogous procedure is applied in the upper part of the output range Y. Therefore, by doing so the system will be able to reach the extremes of the range $[y_{min}, y_{max}]$.

8.3.1 when not to Add "Extreme" Labels

Figure 18:
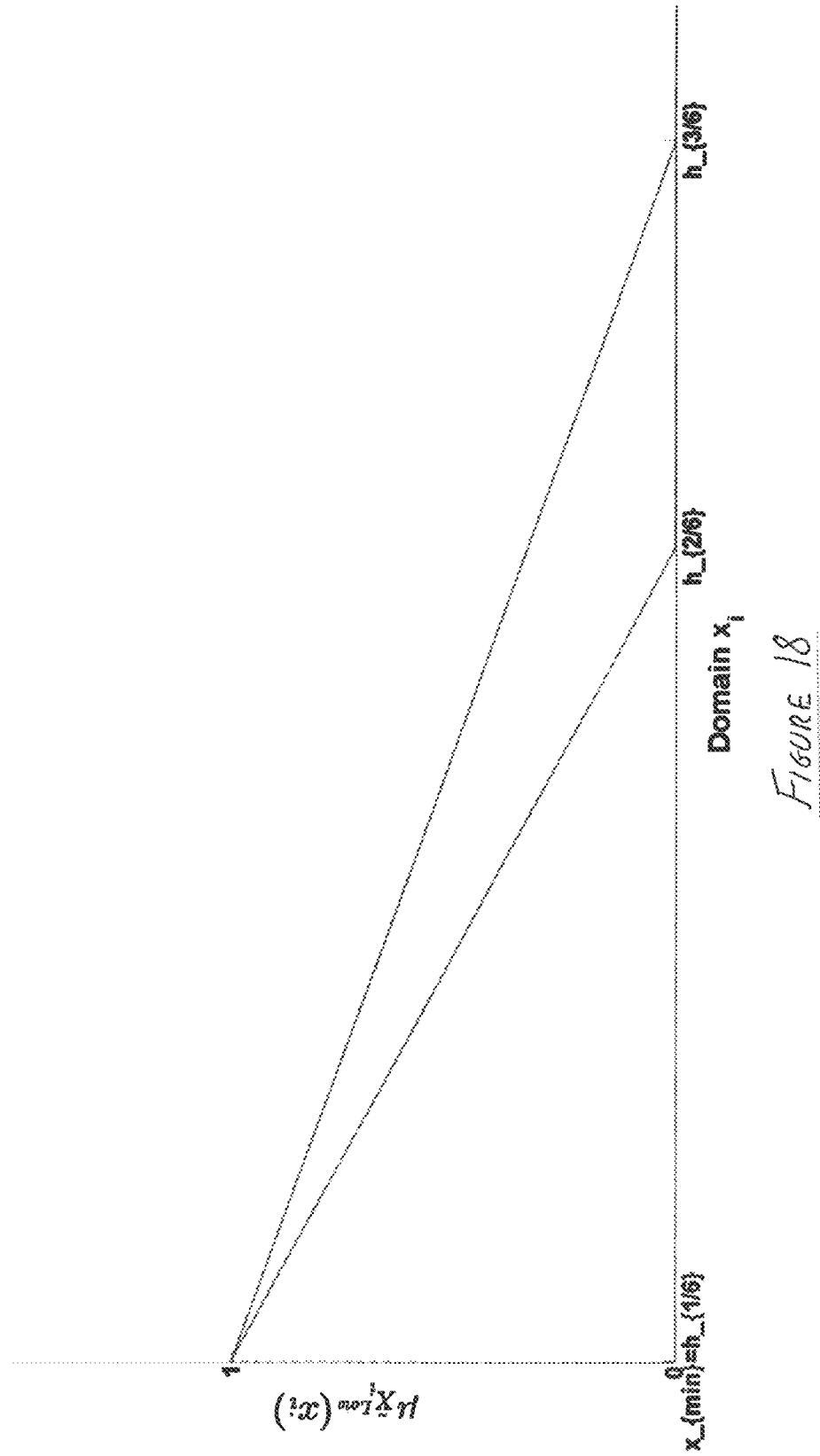
FIG. 18 shows a left triangle MF.

There are certain situations in which the extreme labels are not required, which are:
1. When the MFs at the extremes are already singletons; in this case, the centroid calculation does not limit the output range of the system.
2. When the MFs at the extremes are left/right triangles, as in FIG. 18. In this case, the MF's core is a single point $(x_{min})$ and, thus, the procedure of creating an "extreme" label by taking away half of it is not applicable.

8.4 Building a Universe of Rules

Building the Universe of Rules for continuous output systems is completely analogous to the method described in Section 6.1.1, but replacing the metrics intended for classifiers (as in Section 4.3.2) by the ones intended for continuous output models, introduced in Section 4.4.2.

The tree-based approach remains identical, and each combination of premises is tested against each of the output linguistic labels/fuzzy sets $Y_k$, k=1, . . . , K.

8.5 Pruning the Universe of Rules

The process of pruning the Universe of Rules is completely similar to the one described in Section 6.1.2, but utilising the rule metrics for continuous output systems introduced in 4.4.2.

8.6 Selecting a Rule Base as the Final System

In order to select a subset of rules (or rule base) as the final FL system, a pseudo-random search algorithm can be used, such as Genetic Algorithms (GAs), Particle Swarm Optimization (PSO), among many others.

Taking the Pruned Universe of Rules as the starting point, the process of selecting a rule base consists of finding a finite and relatively small subset of L rules, $L \leq L_{max}$, that offers the best performance for a given dataset D, in the sense of some fitness function, which can be maximising average recall for classifiers, and minimising mean square error for continuous output systems.

After the pseudo-random search algorithm is terminated, the best system found will be chosen and provided as the final classifier/system.

8.7 Producing Human Explainable Reasoning for a Given Decision

Figure 19:
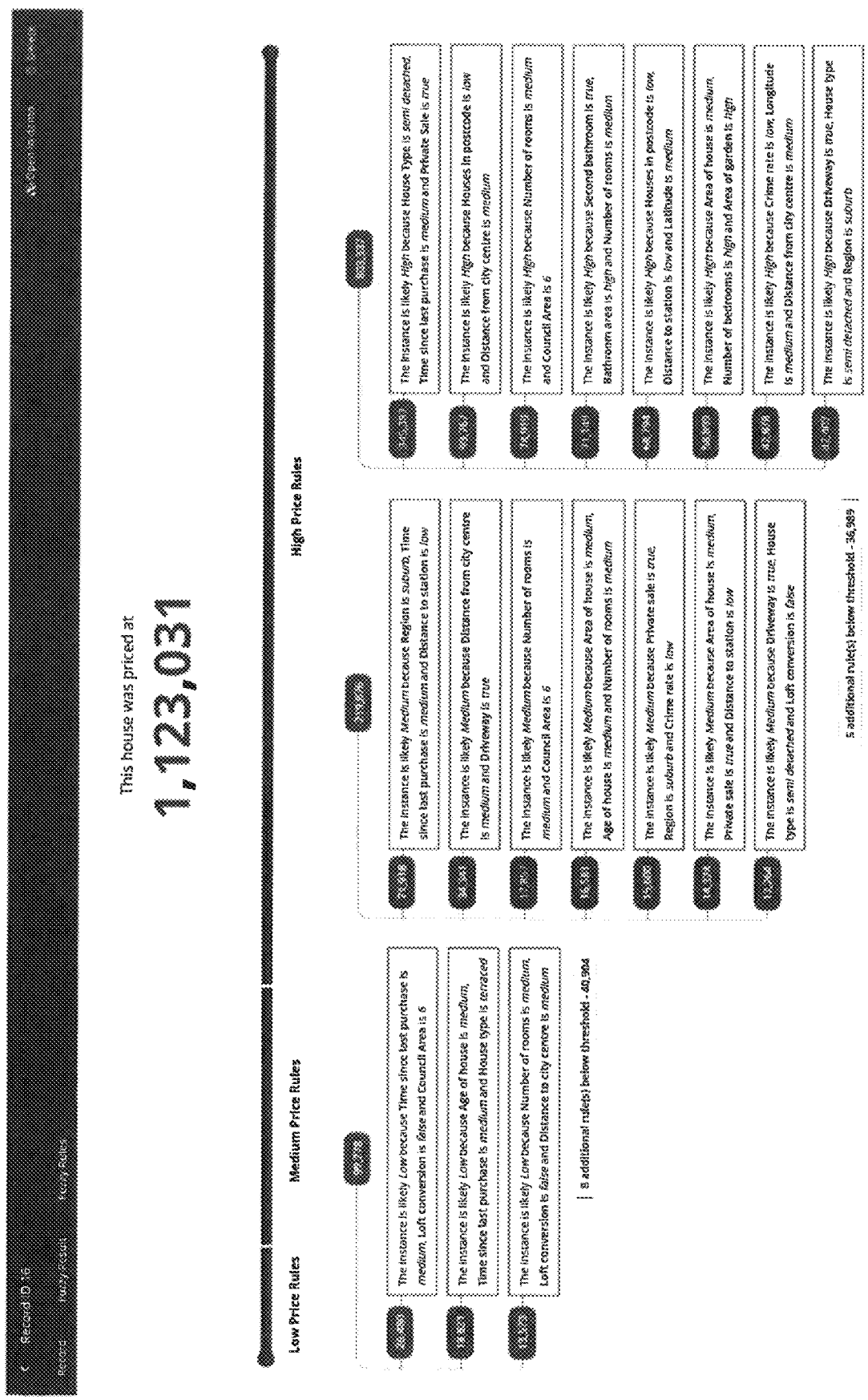
FIG. 19 shows the global AI model presenting a compact view for the reasoning behind a given decision.

Once the global model has been generated, for any given input $\vec{x}_p$, the global model gives a score which mimics the original black box model. The score is then decomposed to the fuzzy logic rules. The system then shows the reasoning for the given output or score and the weight and reason associated with each output linguistic label as shown in FIG. 19.

REFERENCES

[1] "The next big wave: How financial institutions can stay ahead of the ai revolution," (Date last accessed 27 Sep. 2018). [Online]. Available: https://www.finextra.com/surveys/survey.aspx?surveyguid=71aafe10-0023-41b4-9b57-df25f98b9fb3

[2] "Artificial intelligence and machine learning in financial services," (Date last accessed 27 Sep. 2018). [Online]. Available: http://www.fsb.org/2017/11/artificial-intelligence-and-machine-learning-in financial-service/

[3] "Explainable artificial intelligence: Cracking open the black box of ai," Computerworld, November 2017.

[4] I. Sample, "Computer says no: why making ais fair, accountable and trans- parent is crucial," The Guardian, Retrieved A January A 30th, 2018.

[5] "The dark secret at the heart of ai," MIT Technology Review, 2017.

[6] A. Griffin, "Facebook's ai creating its own language is more normal than people think, researchers say," The Independent, 2017.

[7] "Responsible ai: Why we need explainable ai," (Date last accessed 27 Sep. 2018). [Online] Available: https://www.youtube.com/watch?v=A668RoogabM

[8] "Implications of fintech developments for banks and bank supervisors—consultative document," 2017, (Date last accessed 27 Sep. 2018). [Online]. Available: https://www.bis.org/bcbs/publ/d415.htm

[9] "How ai detectives are cracking open the black box of deep learning," Science AAAS, July 2017.

[10] DARPA, "Explainable artificial intelligence (xai)," 2017.

[11] A. Holzinger, M. Plass, K. Holzinger, G. C. Crisan, C. Pintea, and V. Palade, "A glass-box interactive machine learning approach for solving np-hard problems with the human-in-the-loop," 08 2017.

[12] M. T. Ribeiro, S. Singh, and C. Guestrin, ""Why should i trust you?": Explaining the predictions of any classifier," pp. 1135-1144, 2016. [Online]. Available: http://doi.acm.org/10.1145/2939672.2939778

[13] M. T. Ribeiro, S. Singh, and C. Guestrin, "Nothing else matters: Model-agnostic explanations by identifying prediction invariance," CoRR, vol. abs/1611.05817, 2016.

[14] T. Hickey, Q. Ju, and M. H. Van Emden, "Interval arithmetic: From principles to implementation," Journal of the ACM (JACM), vol. 48, no. 5, pp. 1038-1068, 2001.

[15] J. M. Mendel, Uncertain Rule-Based Fuzzy Systems. Springer, 2017.

[16] G. J. Klir and T. A. Folger, Fuzzy sets, uncertainty, and information. Prentice Hall Englewood Cliffs, 1988, vol. 448.

[17] H. A. Hagras, "A hierarchical type-2 fuzzy logic control architecture for autonomous mobile robots," IEEE Transactions on Fuzzy Systems, vol. 12, no. 4, pp. 524-539, August 2004.

[18] J. M. Mendel, R. I. John, and F. Liu, "Interval type-2 fuzzy logic systems made simple," IEEE Transactions on Fuzzy Systems, vol. 14, no. 6, Dec. 2006.

[19] L. Kuncheva, Fuzzy classifier design. Springer Science & Business Media, 2000, vol. 49.

[20] J. A. Sanz, D. Bernardo, F. Herrera, H. Bustince, and H. Hagras, "A compact evolutionary interval-valued fuzzy rule-based classification system for the modeling and prediction of real-world financial applications with imbalanced data," IEEE Transactions on Fuzzy Systems, vol. 23, no. 4, pp. 973-990, 2015.

[21] D. Wu and M. Nie, "Comparison and practical implementation of type-reduction algorithms for type-2 fuzzy sets and systems," in Fuzzy Systems (FUZZ), 2011 IEEE International Conference on. IEEE, 2011, pp. 2131-2138.

[22] M. Nie and W. W. Tan, "Towards an efficient type-reduction method for interval type-2 fuzzy logic systems," in 2008 IEEE International Conference on Fuzzy Systems (IEEE World Congress on Computational Intelligence), June 2008, pp. 1425-1432.

[23] D. Wu and J. M. Mendel, "Designing practical interval type-2 fuzzy logic systems made simple," in Fuzzy Systems (FUZZ-IEEE), 2014 IEEE Inter-national Conference on. IEEE, 2014, pp. 800-807.

[24] J. Alcala-Fdez, R. Alcala, and F. Herrera, "A fuzzy association rule-based classification model for high-dimensional problems with genetic rule selection and lateral tuning," IEEE Transactions on Fuzzy Systems, vol. 19, no. 5, pp. 857-872, 2011.

The invention claimed is:

1. A method of determining and explaining an existing artificial intelligence (AI) system, the existing AI system employing an opaque model from a local or global point of view, the method comprising the steps of:
   providing an input and a corresponding output of the opaque model;
   generating a Type-2 Fuzzy Logic Model (FLM), by training the Type-2 FLM with training data samples, wherein the data samples are synthetic or from the opaque model's evaluation; wherein generating the Type-2 FLM comprises:
   generating a Restricted Universe of Rules (UoR);
   pruning the UoR;
   creating an initial set of rules; and
   applying a pseudo-random search algorithm, to obtain a subset of rules from the initial set of rules;
   and
   inputting the input into the Type-2 FLM to provide an explanation of the output from the opaque model from a local or global point of view.

2. The method according to claim 1, wherein the method further comprises, after the steps of providing an input and before the step of generating a Type-2 Fuzzy Logic Module (FLM), sampling the opaque model around the input to generate training data samples; and
   performing feature selection to determine dominant features;
   wherein the explanation of the output is from a local point of view.

3. The method according to claim 2, further comprising the step of, after sampling the opaque model and before performing feature selection, inputting the training data samples into the opaque model to determine a score and/or classification output.

4. The method according to claim 2, further comprising the step of computing a distance between the input and a data point comprised in the generated training data samples.

5. The method according to claim 4, further comprising the step of generating, using the computed distance, a weight of the data point.

6. The method according to claim 2, wherein sampling the opaque model comprises, for each sample:
S1: Setting a sample value z equal to the input x;
S2: Providing a randomly generated number N, wherein N is between 1 and Nf, the number of features to be changed;
S3: Shuffling each chosen feature randomly; and
repeating steps S1 to S3 for each sample.

7. The method according to claim 2, wherein performing feature selection comprises using step-wise linear regression feature selection, to select dominant features.

8. The method according to claim 2, further comprising the step of resampling by repeating the step of sampling the opaque model around the input, using the determined dominant features, to generate secondary training data samples.

9. The method according to claim 2, wherein the Type-2 FLM is local.

10. The method according to claim 1, wherein the Type-2 FLM is global and wherein the explanation of the output is from a global point of view.

11. A system for determining and explaining an existing artificial intelligence(AI) system, the existing AI system employing an opaque model from a local or global point of view, the system comprising a processor adapted to perform the steps of:
providing an input and a corresponding output of the opaque model;
generating a Type-2 Fuzzy Logic Model (FLM), by training the Type-2 FLM with training data samples wherein generating the Type-2 FLM comprises:
generating a Restricted Universe of Rules (UoR);
pruning the UoR;
creating an initial set of rules; and
applying a pseudo-random search algorithm, to obtain a subset of rules from the initial set of rules; and
inputting the input into the Type-2 FLM to provide an explanation of the output from the opaque model.

12. A method of determining and explaining an existing artificial intelligence (AI) system, the existing AI system employing an opaque model from a local or global point of view, the method comprising the steps of:
providing an input and a corresponding output of the opaque model;
generating a Type-2 Fuzzy Logic Model (FLM), by training the Type-2 FLM with training data samples, wherein the data samples are synthetic or from the opaque model's evaluation; and
inputting the input into the Type-2 FLM to provide an explanation of the output from the opaque model from a local or global point of view.

* * * * *